(12) United States Patent
Karaoguz et al.

(10) Patent No.: US 8,640,204 B2
(45) Date of Patent: Jan. 28, 2014

(54) WIRELESS DEVICE FOR GROUP ACCESS AND MANAGEMENT

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 542 days.

(21) Appl. No.: 12/549,620

(22) Filed: Aug. 28, 2009

(65) Prior Publication Data

US 2011/0055901 A1 Mar. 3, 2011

(51) Int. Cl.
*H04L 29/06* (2006.01)

(52) U.S. Cl.
USPC ............ 726/4; 726/2; 726/3; 726/26; 726/27; 726/29

(58) Field of Classification Search
None
See application file for complete search history.

(56) References Cited

U.S. PATENT DOCUMENTS

| | | | |
|---|---|---|---|
| 2003/0229900 A1* | 12/2003 | Reisman | 725/87 |
| 2004/0158712 A1* | 8/2004 | Lee et al. | 713/165 |
| 2005/0002405 A1* | 1/2005 | Gao | 370/401 |
| 2006/0143295 A1* | 6/2006 | Costa-Requena et al. | 709/227 |
| 2007/0157281 A1* | 7/2007 | Ellis et al. | 725/134 |
| 2007/0208948 A1* | 9/2007 | Costa-Requena et al. | 713/185 |
| 2007/0211734 A1* | 9/2007 | Yang et al. | 370/401 |
| 2007/0254634 A1* | 11/2007 | Costa-Requena et al. | 455/412.1 |
| 2008/0046578 A1* | 2/2008 | van der Gaast | 709/229 |
| 2009/0254976 A1* | 10/2009 | Huotari et al. | 726/3 |
| 2010/0325695 A1* | 12/2010 | Suzuki | 726/3 |

FOREIGN PATENT DOCUMENTS

WO WO/2008/005060 * 5/2008 .............. G06F 13/00

* cited by examiner

*Primary Examiner* — Jung Kim
*Assistant Examiner* — Adrian Stoica
(74) *Attorney, Agent, or Firm* — Garlick & Markison

(57) ABSTRACT

A system and method for establishing a group of wireless devices having shared media stored thereupon associates each group member device of the group of wireless devices, communicates with at least some of the group member devices of the group of wireless devices to identify shared media and upon receiving a request transmitted by a group member device of the group of wireless devices, supports access to shared media. The shared media may be stored on a different group member device, upon a managing server computer, or a media server. Upon a successful validation, the group member device that made the request is notified to facilitate the access to the shared media. The notification includes access information.

29 Claims, 16 Drawing Sheets network 170 network 10 network 50 network 80 network 150 network 170 network 170

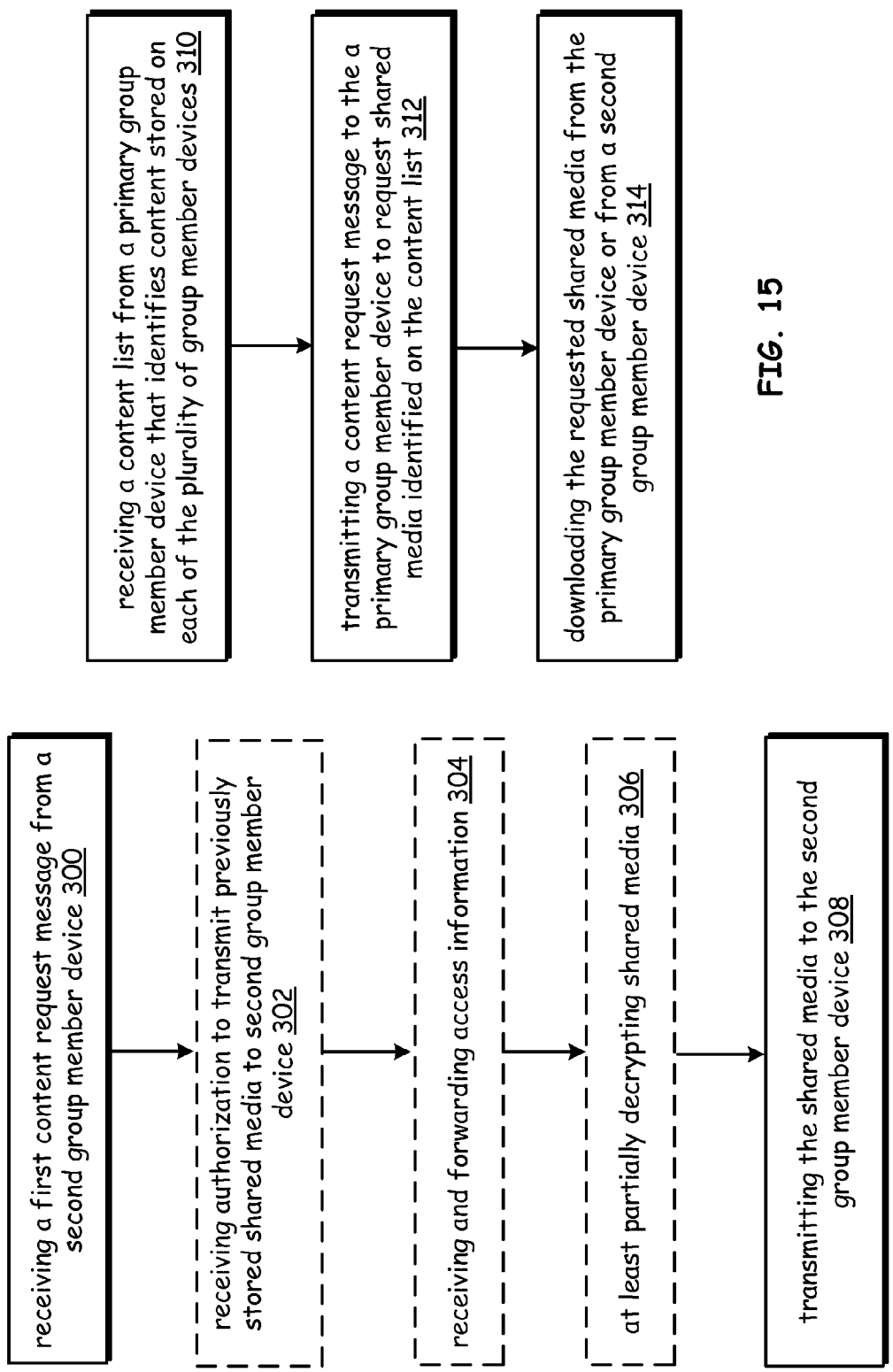

network 350 network 400

| device ID | requested resource | required resources |
|---|---|---|
| aa1 (iPod) | iTunes song (from iTunes store) | cellular transceiver, account and access information |
| aa1 (iPod) | streaming media (from iTunes store) | cellular transceiver, processing resources, account and access information |
| ab7 (cell ph.) | streaming media (from account based media source) | account and access information |
| xy9 (laptop) | iTunes song (stored on group dev.) | shared media content |
| ab7 (cell phone) | communication link (lower cost) | transceiver circuitry |

← 452
← 454
← 456
← 458
← 460

FIG. 18
table 450

WIRELESS DEVICE FOR GROUP ACCESS AND MANAGEMENT

BACKGROUND

1. Technical Field

The present invention relates to wired and wireless communications and, more particularly, to accessing shared media, services and resources by grouped member devices.

2. Related Art

In today's world of rapidly changing devices that instantly add tools that become a significant part of everyday life, the Internet has served as a backbone for coupling networks of all types include cellular and wireless local area networks as well as wired networks to create opportunity for the continual advancement of feature based devices. As different devices are developed to operate using these networks, popular features are often limited to the particular devices. Thus, devices are often application specific having application related data formats and associated interfaces that are incompatible. Accordingly, specific functionality corresponds to specific hardware platforms that support specific protocols and interfaces.

Many communication systems, nonetheless, support wireless and wire lined communications between wireless and/or wire lined communication devices to expand global communications. Such communication systems range from national and/or international cellular telephone systems to the Internet to point-to-point in-home wireless networks.

Each type of communication system is constructed to operate to be compatible with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s).

For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is connected to a radio transceiver (e.g., a station for in-home and/or in-building wireless communication networks, RF modem, etc.). The various circuit blocks of a radio transceiver jointly operate to support communications and associated functionality according to the type of communication system(s) it supports.

The Internet has thus vastly expanded capabilities and services that may be provided to the user. For example, users can now download media, including streaming media on demand. Other network based services are also now available based on the connectivity that is possible due to the integration and cross platform coupling that the Internet has made possible.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 14 is a flowchart that illustrates a method by a group member device operable to deliver shared media based on a group association that includes a plurality of group member devices according to an alternate embodiment of the invention.

FIG. 15 is a flowchart that illustrates a method by a group member device for accessing shared media based on a group association that includes a plurality of group member devices according to an embodiment of the invention.

FIG. 18 is a table that illustrates an embodiment for resource sharing based on an identity of a requesting device and characteristics of requested shared media.

DETAILED DESCRIPTION OF THE DRAWINGS

Figure 1:
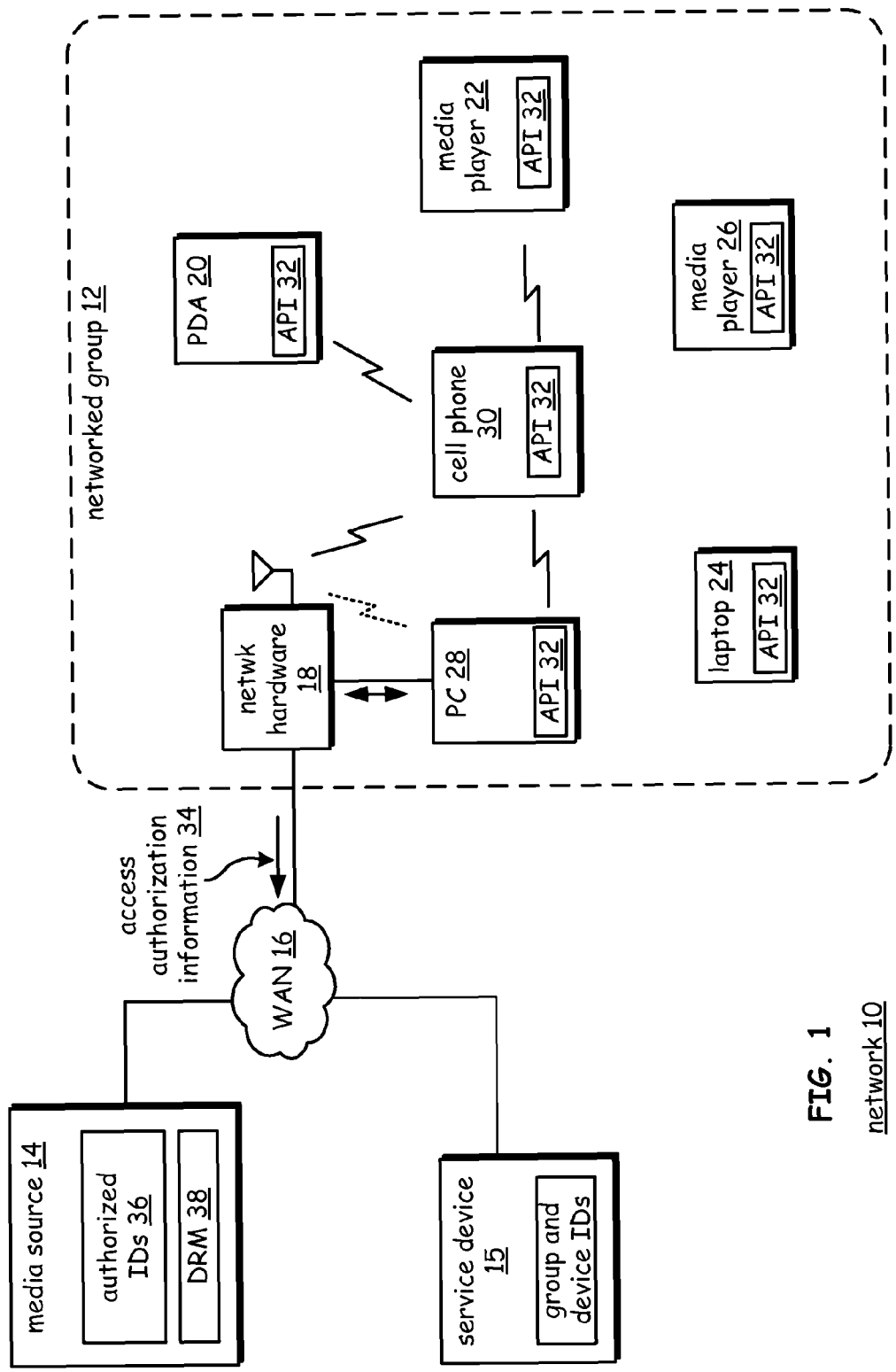
FIG. 1 is a functional block diagram illustrating a communication system that supports media, service and resource sharing and other operations according to one embodiment of the invention.

FIG. 1 is a functional block diagram illustrating a communication system that supports media, service and resource sharing and other operations according to one embodiment of the invention. A network 10 includes a networked group 12 of wireless devices and wired devices, a media source 14 and a wide area network (WAN) 16 that operably couples media source 14 and/or service device 15 to devices of networked group 12. WAN 16 includes a packet data network that may be a private or public network such as the Internet. Networked group 12 includes network hardware 18 and further includes group member devices 20-30. Networked group 12 further includes supporting nodes, network bridging devices and interface devices to operably couple devices of networked group 12 to WAN 16 even though such devices are not shown with the exception of network hardware 18. Network hardware 18 represents the functionality of both base stations and access points to couple wired and wireless devices to WAN 16. Group member devices 20-30 include handheld wireless communication devices such as personal digital assistant (PDA) 20, media player 22, laptop (computer) 24, media player 26, personal computer 28 and cell phone 30.

In the exemplary embodiment of FIG. 1, a primary group member, e.g., cell phone 30 creates an association of group member devices 20-30 for the networked group 12 of wired and wireless devices. The association of group members includes at least two devices and may be permanent (until changed) or temporary limited by time or usage. Cell phone 30, as a primary group member, is operable to store a list of authorized identities that are allowed to access to shared media, services or resources. Cell phone 30 determines, therefore, whether a requested access or sharing is authorized. In one embodiment, such determinations may be based on defined criteria such as stored digital rights management specifications (DRM).

Digital rights management refers to access control technologies that limit access and use of content. Generally, DRM limits the playback of protected content to prevent copying and/or unpaid use of such content. Additionally, hardware often limits access to content because content is formatted in a manner in which only specified types of devices can access the content. As such, a user typically purchases multiple hand held devices to access various types of content and or services. Generally, DRM and/or hardware limitations only allow access in a specified manner and often limit enjoyment of content and/or services that are purchased by a user. The embodiments of the invention, among other aspects, address authorized access to shared media, services or resources that would otherwise by limited by digital rights management or by hardware limitations. Specifically, DRM specifications stored within any of the group member devices 20-30 as well as the media sources such as media source 14 or service device 15 allow group access to shared media, services or resources under the control of a group member device.

In one embodiment, the DRM based sharing logic is stored within the primary group member such as cell phone 30. Thus, cell phone 30, upon receiving an access request message from another group member device is operable to determine that the other group member device of group member devices 20-30 is authorized to access the shared media, service or resource. After validating the access request by determining the other group member device is authorized to access the shared media, service or resource, cell phone 30 communicates with the other group member device to allow access to the shared media, services or resources. This communication can be in the form of transmitting access information or even transmitting the requested media to the other group member device.

Generally, each of the group member device identities for group member devices 20-30 are entered into memory of cell phone 30 or received by cell phone 30 from the group of wireless devices 12. The identities are stored in a way to create an association or group for the group member devices 20-30. Based on the DRM specifications and this association, group member devices 20-30 may share or access specified media, service or resource for which group access is allowed. The term "resources" refers to all resources of the device (here, cell phone 30) and includes hardware circuitry, software, logic, account and access information, data, etc. For example, one group member device may grant access to hardware resources to allow the other device to access shared media or services that can only be accessed with specific hardware, interfaces, or communications protocols. Alternately, cell phone 30 may allow another cell phone device to use its transceiver circuitry and account information (identity) to place a call.

The group member devices 20-30 of the group of wireless devices 12 includes a plurality of group member devices 20-30 that are associated as a group and have access rights to shared media, services and shared resources. The shared media may be discrete files of media (e.g., video or audio content, electronic books, etc.) or streaming media received by a plurality of group member devices. All references to shared media include media in all forms include discrete files and streaming media. Furthermore, services may be shared that do not necessarily require the sharing of content or media. In one embodiment, hardware and software resources including data and account access information that are required to access shared media or services are shared to support and allow the access to the requested shared media or service.

Resource sharing may be for the purpose of accessing shared media or services or may be for other reasons. For example, transceiver circuitry may be shared for the sole reason of reducing the cost of a call. Thus, if a temporary group association is defined, a first cell phone having a local subscription may share its phone, account and access circuitry, logic and resources to allow another cell phone (e.g., a visiting cell phone) to use such resources for a call. The visiting cell phone might, therefore, communicate with the first cell phone via a WLAN, Bluetooth or tethered connection to gain access to the shared resources to place the call. For example, permission to use such resources may be limited in a number of ways including duration, usage, or number of occurrences.

In the described embodiment, the group member devices 20-30 are associated with cell phone 30 that is operable to control access to shared media that is distributed by media source 14. Thus, cell phone 30, as a part of managing or establishing the group association for accessing shared media, may store the device IDs to create the group. In this example, a user of cell phone 30 enters the device identities for each of the group member devices 20-30 to create the group or alternately establishes a wired or wireless connection with the devices of networked group 12 and selects an option to create the association. Cell phone 30 then stores at least one type of identity that corresponds to the device of networked group 12 as a part of creating the grouped association.

Additionally, in one embodiment, the user of the primary group member device such as cell phone 30 selects types of media and other resources that may be shared and/or a total amount of access or usage of the shared media or resource. The type of access or total amount of access is tiered and is thus specified either as a group total, individual group member device total for each group member device (could be different for the different devices) or even sub-group totals. For sub-groups, sub-group members of group member devices 20-30 of the sub-group have equal allocations that are different from other sub-groups. In one embodiment, cell phone 30 monitors a number of times shared media or a service is accessed and denies access after the shared media or service has been accessed a specified number of times either collectively by the group of wireless devices 12, by an associated sub-group, or by the individual group member device of the group member devices 20-30.

As may further be seen, each device of networked group 12 includes an application programming interface (API) 32. API 32 generally comprises an application specific interface between the group member devices 20-30 of networked group 12 that supports media, service and/or resource sharing. For example, API 32 supports transmission and processing of communication signals, control commands and data that support group media and service sharing and resource sharing. As such, PDA 20, for example, may use a personal area network wireless protocol for short distance wireless communications to establish a communication link with cell phone 30 to receive shared media delivered to cell phone 30 from media source 14. The API 32 within each of cell phone 30 and PDA 20 jointly communicate to support such operations.

Cell phone 30, in one embodiment, transmits access authorization information 34 to media source 14 either in response to receiving a request from one of group member devices 20-30 to access shared media or in advance to support shared access to shared media by group member devices 20-30 based in part upon stored DRM requirements that support group access to shared media.

For example, cell phone 30 may send a group identity or a list of device identities to media source 14 having an association for accessing shared media to enable any one of group member devices 20-30 to request shared media. Accordingly, media source 14 stores authorized identities 36 for shared media. In an alternate embodiment, cell phone 30 does not send a list of identities. Rather, if a group member seeking access to the shared media is an authorized device, cell phone 30 merely transmits its own identity to media source 14 to download the requested media and then transmits the requested media to the other group member device of group member devices 20-30 seeking access to the shared media. For this embodiment, DRM specifications in media source 14 are not required to allow group access to shared media as such operations are transparent to media source 14.

Alternately, if cell phone 30 allows another group member device to use its resources, the other device (e.g., media player 22) uses hardware and/or software resources to establish a communication link with media source 14 to download desired media. For example, if media source 14 is the iTunes™ store operated to support media downloads for Apple™ products and if cell phone 30 is, for example, an iPhone™ which is an Apple product, media player 22 may use communication hardware and software of cell phone 30 as well as access logic and account information stored within cell phone 30 to download media content from media source 14. Moreover, media player 22 may use logic and processing capabilities of cell phone 30 to perform a protocol conversion of the downloaded media content prior to downloading the content from cell phone 30.

The access authorization information 34 may also include, in the same or subsequent transmissions or messages, information to allow access that corresponds to a specific content request transmitted by one of group member devices 20-30. Accordingly, media source 14 transmits shared media to respond to a content request according to DRM specifications 38. Generally, all such sharing of media content and hardware and software resources including access logic and data is performed in association with the DRM specifications that allow group based access to media content. Alternately, access permissions may be tiered to allow access to resources that don't allow violation of the DRM specifications. For example, access may be given to share communication resources or processing resources but not access logic or data.

One aspect of DRM specifications 38 in the described embodiment of the invention is that group access to specified media content is validated by a primary group member device based on group associations. While not shown explicitly here in FIG. 1, and as will be explained in greater detail in relation to the figures that follow FIG. 1, cell phone 30, in one embodiment, stores DRM specifications in relation to shared media access by group member devices 20-30 to allow group access to shared media.

Another aspect of DRM specifications 38 in the described embodiment is that the group member devices 20-30 may be different types of devices having different types of hardware resources and associated capabilities wherein the group members of an associated group are allowed to use each other's resources to gain access to shared media. For example, PDA 20 may access the memory of cell phone 30 to download shared media stored by cell phone 30. Alternatively, PDA 20 may utilize hardware resources of cell phone 30 to download shared media from media source 14.

As is suggested in FIG. 1, cell phone 30 may establish a communication link with network hardware 18 to access media source 14 or, alternatively, may utilize network resources of personal computer 28 to communicate with media source 14 through network hardware 18. If network hardware is an access point, cell phone 30 utilizes, in one embodiment, a personal area network protocol such as Bluetooth™ or a wireless local area network protocol based on IEEE 802.11 to communicate with network hardware 18. If network hardware 18 comprises one or more cellular network elements such as a base station transceiver, then cell phone 30 communicates with network hardware 18 using a corresponding cellular protocol. Cell phone 30 also determines, in one embodiment, a required format or protocol for the shared media for the group member device seeking access to the shared media. This determination is based upon device capabilities of the group member device seeking access to the shared media. Accordingly, cell phone 30 formats the shared media to correspond with the required format or protocol and transmits the shared media in the required format or protocol to the group member device of group member devices 20-30.

Additionally, in one embodiment, each API 32 includes buffering logic and formatting logic to buffer and format shared media according to device capabilities of the group member device of group member devices 20-30 that is to receive the shared media 16. If, for example, shared media 16 is received over a first communication channel and is transmitted over a second and slower communication channel, an API 32 would buffer the received media content until transmitted on the second communication channel. Additionally, even if the second communication channel is operable to transmit as fast as shared media 16 is received on the first communication channel, formatting or protocol conversion processes for repackaging the shared media 16 may introduce delay thereby requiring buffering.

Cell phone 30 is further operable to maintain a billing record for access to shared media (including media transfers), streaming media, services (including, for example, communication services), etc. for subsequent billing for the access by the group member devices 20-30 according to usage terms. Additionally, in one embodiment, cell phone 30 is a primary group member device that has particular account access rights to modify data and control parameters for an account that corresponds to the shared access activities for group member devices 20-30. Accordingly, when the particular account is accessed by cell phone 30, specified data and control parameters are produced or displayed to cell phone 30. Changes to the specified data and control parameters made by cell phone 30 are then accepted. Cell phone 30 accesses and changes the account information that is stored on a remote server, by way of WAN 16.

In another embodiment, cell phone 30 maintains a list of content stored on each group member device of the group member devices 20-30. This content list is populated or updated when access to shared media is authorized by cell phone 30 or when shared media is transmitted to a group member device. The content list is also populated or updated by communicating with one or more group member devices 20-30 to determine what shared media 16 is stored thereon. Specifically, a content request may be transmitted by cell phone 30 to determine what shared media is stored on each of the group member devices of group member devices 20-30.

Cell phone 30 transmits the content list to at least one group member device of the group member devices 20-30 to facilitate group member devices sharing media amongst each other. Thus, a primary group member such cell phone 30, is operable to receive a content request message originated by a first group member device for shared media previously delivered to a second group member device. In response, cell phone 30 validates the request for the first group member device to access to the shared media that was previously delivered to the second group member device. Cell phone 30 transmits access information to at least one of the first and second group member devices to enable the first group member device to access the shared media stored on the second group member device. Alternately, cell phone 30 transmits the shared media to the first group member device. To transmit the shared media to the first group member device, cell phone 30 retrieves the shared media from media source 14 or from the second group member device.

One aspect of one embodiment of the invention is that cell phone 30 transmits access information that includes an encryption key to the group member device or, alternately, at least partially decrypts the shared media content prior to transmitting the shared media to the group member device of group member devices 20-30.

Figure 2:
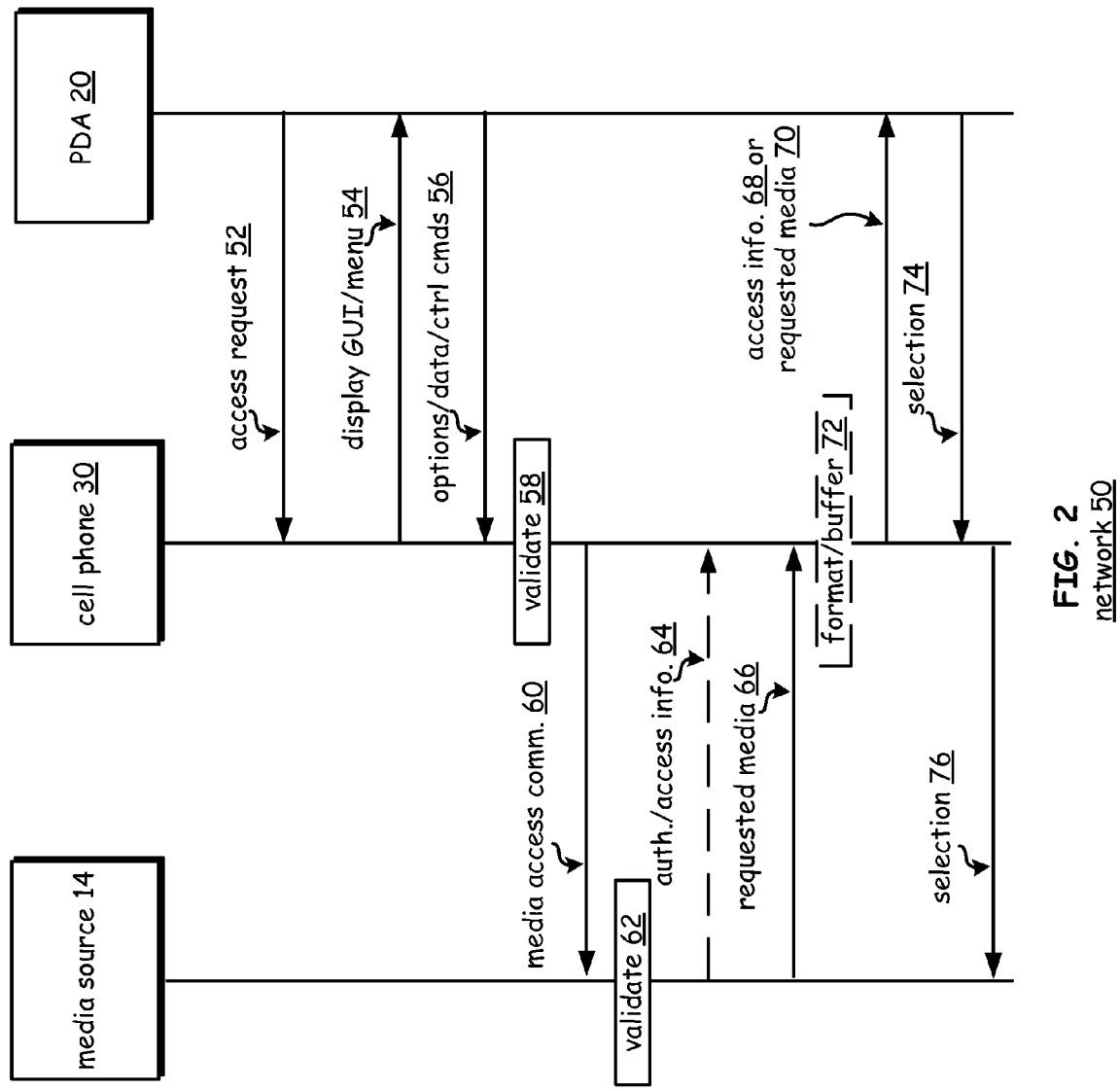
FIG. 2 is a signal sequence diagram illustrating operation of a plurality of communication devices of a network according to one embodiment of the invention in which one wireless device uses resources of another wireless device to access shared media.

FIG. 2 is a signal sequence diagram illustrating operation of a plurality of communication devices of a network 50 according to one embodiment of the invention in which one wireless device uses resources of another wireless device to access shared media. PDA 20 communicates with cell phone 30 over a wireless channel and cell phone 30 communicates with media source 14 over a wireless communication channel as well as a wired communication channel. Media source 14 may easily be, instead, a network service provider or even another one of the grouped member devices including media player 22, laptop 24, media player 26 or personal computer 28 or similar device as shown in FIG. 1.

The wireless communication channel between PDA 20 and cell phone 30 comprises one of a personal area network (PAN) protocol such as Bluetooth protocol communication link, a wireless communication link with an access point using a wireless local area network (WLAN) protocol such as IEEE 802.11 (any of the various 802.11 communication protocols may be used), or any other wireless link including infrared frequency communication protocols, or a wired communication link (e.g., by a tether or a universal synchronous bus (USB) cable). The communication link between cell phone 30 and media source 14 comprises at least one of a cellular communication link, a wired communication link over a wide area network such as WAN 16, a WLAN communication link, a PAN communication link, or any other wireless link including infrared frequency communication protocols.

In operation, PDA 20 transmits access request 52 to cell phone 30 to request access to a resource of cell phone 30. For example, PDA 20 may want to use communication circuitry of cell phone 30 to establish a communication link with a remote device that provides a service. For example, access request 52 may be an access request for a particular web page for a service provider. In such a case, cell phone 20 may communicate with a remote server associated with the specified web page. Access request 20, and all other access request messages mentioned herein generally include any type of message that is a request for access to resources of a device, for access to shared media or other content stored on the device, for the receiving device to perform requested operations, for the receiving device to engage in specified communications, etc. In one embodiment of this type of operation, cell phone 30 generates a graphical user interface (GUI) based menu or other menu and transmits menu 54 to PDA 20. Menu 54 may also comprise any other menu format including a simple text menu prompting the user to reply in a specified manner.

Thereafter, PDA 20 transmits one of a selected option, data, or control command 56 in response to menu 54 to cell phone 30. Among other options, menu 54 may require PDA 20 to reply with an access code or identity or a choice that specifies the type of access PDA 20 wishes to make. It should be understood that the communications 52-56 represent three or more communications that may be iterative.

Access request 52 may be, instead of an access request for a hardware resource of cell phone 30, may be a request to access memory of cell phone 30 or to request access to shared media. The shared media may be shared media that is stored within cell phone 30 or it may be shared media that is stored within media source 14.

After the communications 52-56 are complete, cell phone 30 validates the access request received in access request 52 (and subsequent communications 52-56) in validation step 58. If the access request includes use of transceiver circuitry, as is the case here in FIG. 2, the process continues by establishing communications 60 through a communication link with a media source using cellular transceiver circuitry. Media access communications 60 can includes any communication to facilitate the access request of access request 52. Media access communications 60 include communications made in response to received commands from PDA 20. Thereafter, media source/other group member device 14, 22-28 validates the request of communication 60. Once validated, media source 14 may optionally transmit an authorization or access information 64 to cell phone 30. Media source 14 then transmits requested media 66 to cell phone 30. Thereafter, cell phone 30 transmits either access information 68 or requested media 70 to PDA 20 based on the application and nature of access request 52. If cell phone 30 receives access information 64 for delivery to PDA 20, cell phone 30 transmits access information 68 to PDA 20. If cell phone 30 received the requested media 66 at an earlier time, and received authorization in authorization/access information 64 to deliver the requested media, then cell phone 30 transmits requested media 70. Alternatively, if cell phone 30 receives requested media 66 in response to communication 60, then cell phone 30 transmits requested media 70 to PDA 20.

Generally, FIG. 2 represents that an access request from PDA 20 or another group member device 20-30 of networked group 12, for access to the resources of cell phone 30 including hardware resources, memory content, shared media may be given. Additionally, cell phone 20 may communicate on behalf of PDA 20 or under the control of PDA 20 with media source 14 to receive the requested media for delivery to PDA 20. Another aspect of the example of FIG. 2 is that cell phone 30 is operable to generate modified displays/data for PDA 20.

As is shown, cell phone is operable to perform step 72 to format or buffer displays or data prior to transmitting to PDA 20. Thus, if requested media 66 comprises a video or a web page, cell phone 30 is operable to modify a format of the media 66 that corresponds to technical capabilities or requirements of PDA 20. Finally, if the requested media 70 is a menu or web page, or otherwise includes selectable options, PDA 20 transmits selection 74 to cell phone 30 that in turn transmits selection 76 to media source/other group member device 14, 22-28. Additionally, cell phone 30 may also transmit usage instructions, methods of interaction with the web server/web page, testing related parameters for a variety of purposes including determining how to support the requested access, requests for authorization of currently unauthorized functionality a busy indication if the requested web page is unavailable. Other steps performed by cell phone 30 may include determining at least one web site address that corresponds to the requested web page, determining the second group member device is authorized to access the at least one web site and retrieving at least one internet protocol address for the at least one web site to support operations associated with the second group member device request for the web page. While not shown here, the communications 64-74 could include multiple communications or steps in any sequential order to facilitate a particular service or media access.

In the example of FIG. 2, cell phone 30 may engage in media access communications 60 as if it were the device seeking access to the media or service and control the communications. Alternately, cell phone 30 may allow PDA 20 to use its resources for media access communications 60. In this example, PDA 20 uses the identity, account and access information and transceiver circuitry of cell phone 30 but it is PDA 20 that controls such communications.

Figure 3:
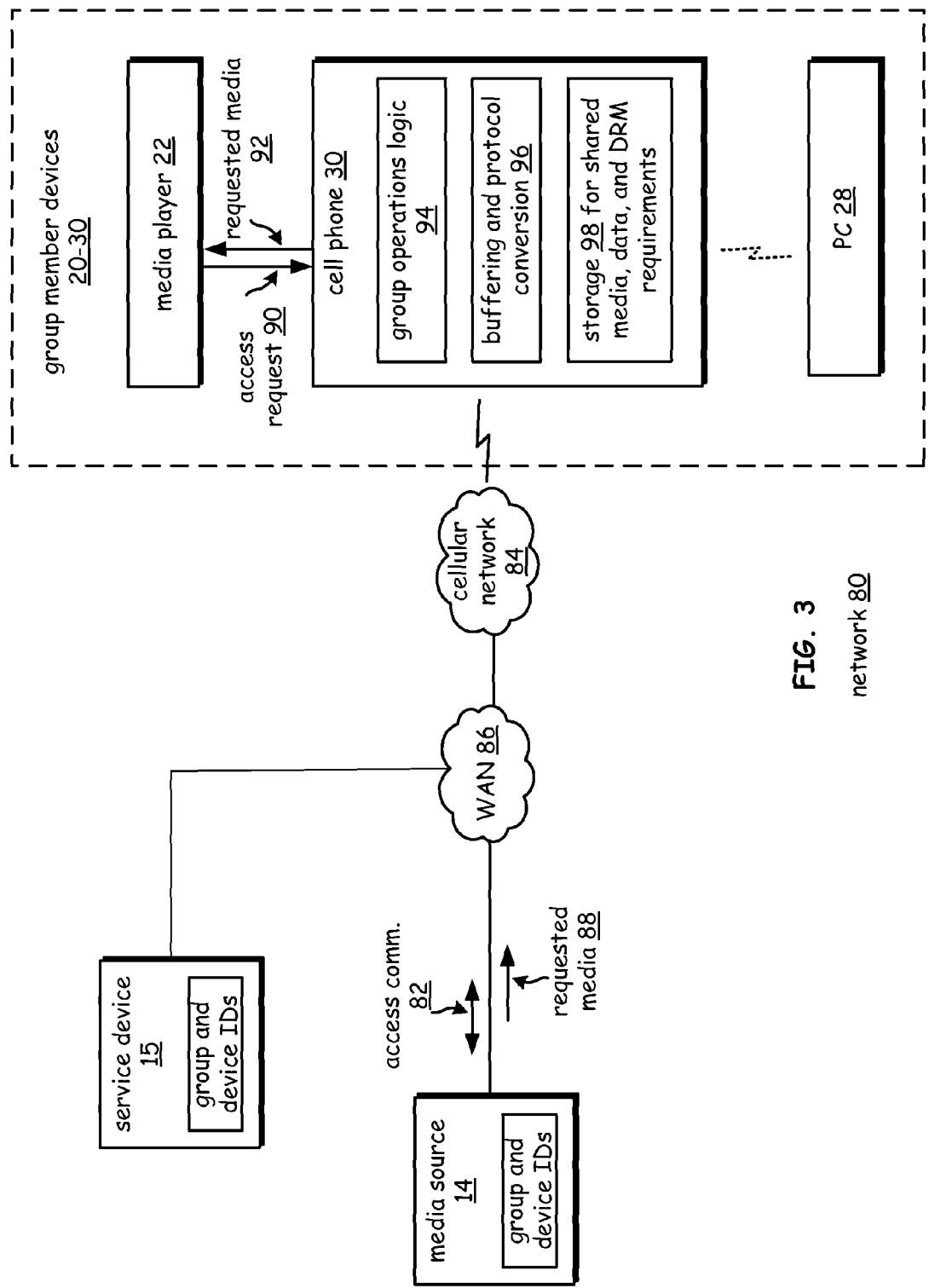
FIG. 3 is a functional block diagram that illustrates operation for accessing shared media according to a second embodiment of the invention in which shared media flows through a cell phone for delivery to a group member device.

FIG. 3 is a functional block diagram that illustrates structure and operation for accessing shared media according to a second embodiment of the invention in which shared media flows through a cell phone 30 for delivery to a group member device. In FIG. 3, a network 80 includes cell phone 30, media source 14 and group member devices 20-30 as described before although only media player 22 and personal computer 28 of group member devices 20-30 are shown in the figure. Media source 14 may readily be replaced by any type of networked service provider such as service device 15 that provides services other than or in addition to delivery of media. Here, cell phone 30 engages in access communications 82 with media source 14 by way of cellular network 84 and WAN 86 and receives, in response, requested media 88 from media source 14 though such access communications may readily occur with service device 15.

Cell phone 30 either receives the requested media 88 based on its own initiated request or subsequently based on receiving an access request 90 from another group member device such as media player 22 to prompt the access communications 82 and downloading of requested media 88. Upon receiving access request 90, if the access request is for shared media, cell phone 30 transmits requested media 92 to media player 22 immediately if it had previously received the shared media. The access communications 82 and receiving requested media 88 occurs in response to cell phone 30 receiving access request 90 if requested media 88 had not already been received by cell phone 30. If access request is for access to a service provided by media source 14 or another networked service provider, then cell phone 30 facilitates the access and produces data, generates displays, or performs operational steps according to the characteristics of the associated service.

As may be seen, cell phone 30 includes group operations logic 94, buffering and protocol conversion module 96 and storage 98 for storing shared media, data and DRM requirements. Group operations logic 94 defines logic to support access requests for resources or shared media including logic for associated operations according to the embodiments of the invention. For example, logic 94 may include validation logic that is different for the different group member devices of group member devices 20-30 in terms of resource sharing and in terms of media sharing. For example, only some of member devices 20-30 may be allowed to access communication resources of cell phone 30. Alternately, different group member devices may have different access rights to shared media.

Generally, cell phone 30 receives access request message 90 and, upon determining that the group member device of group member devices 20-30 that is attempting to access the shared media is part of an authorized group for the shared media, transmits requested media 92 or allows the requested media to be downloaded from it. The media is obtained by cell phone 30 from media source 14 either prior to receiving or in response to receiving access request message 90. Requested media 92 transmitted by cell phone 30 to media player 22 comprises at least a portion of the stored media in storage 98.

Figure 4:
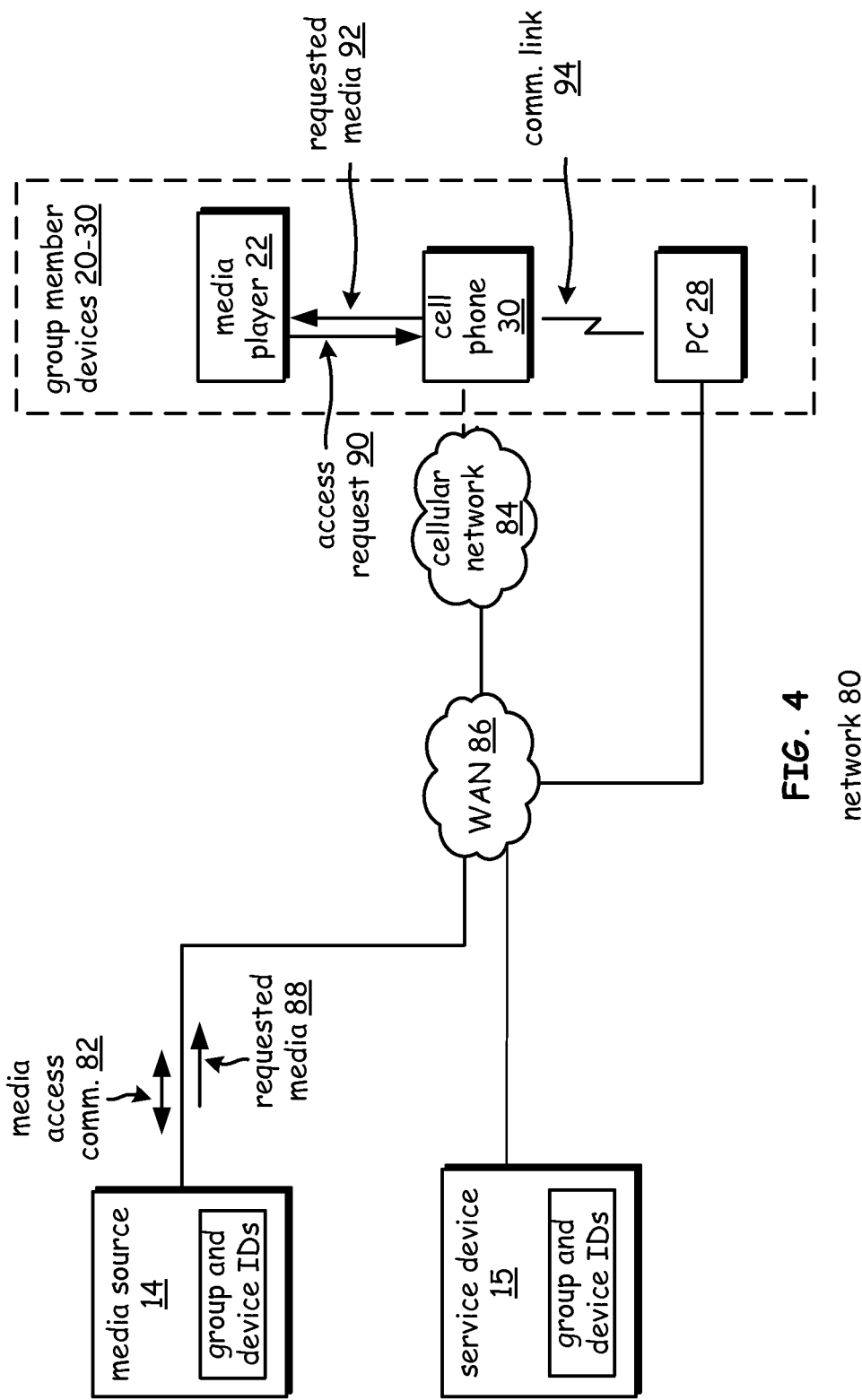
FIG. 4 is a functional block diagram that illustrates an alternate operation for accessing shared media according to an embodiment of the invention in which shared media flows through a cell phone for delivery to a group member device.

FIG. 4 is a functional block diagram that illustrates an alternate operation for accessing shared media according to an embodiment of the invention in which shared media flows through a cell phone 30 for delivery to a group member device. Network 80 includes the same elements discussed in relation to FIG. 3. Those elements will not be described again here. One aspect to note about FIG. 4, however, is that cell phone 30 communicates with personal computer 28 over a communication link 94 to gain access to WAN 86 instead of communicating through cellular network 84. Communication link 94 can be wireless as shown here or wired through a tether, USB cable or other cable. Accordingly, personal computer 28, which is operably coupled to communicate over WAN 86, allows cell phone 30 to engage in access communications 82 and to receive the requested media 88 by way of personal computer 28 thereby eliminating the need for communicating through cellular network 84. Thus, cell phone resources and associated costs may be eliminated from the communication path even through media player 22 is receiving the requested media 92 by way of cell phone 30.

As may be seen, therefor, media player is using the resources of cell phone 30 that, in turn, is using the resources of personal computer 28 to receive requested media 88. In addition to saving costs of using cellular network 84, such operations may require less battery power thereby enabling cell phone 30 to operate for a longer period. In one embodiment, such switching from cellular network 84 to personal computer 28 is triggered by a low battery charge on cell phone 30. In another embodiment, such switching is always triggered by a determination that communication link 94 has become available. Alternately, communication link 94 may be with a WLAN access point instead of PC 28. Accordingly, when the access point becomes available, according to one embodiment of the invention, cell phone 30 utilizes communication link 94 to avoid cellular network 84. If required, an existing call through network 84 is handed off in favor of an established communication link 94.

While a media source 14 is described in relation to providing requested media in FIGS. 1-4 and much of the discussion of FIGS. 1-4 relates to shared media (including stored and streaming media), it should be understood that any type of service provider may be shown in place of media server 14 by, for example, service device 15. Accordingly, access related communications may be for the purpose of supporting access to the requested service.

Figure 5:
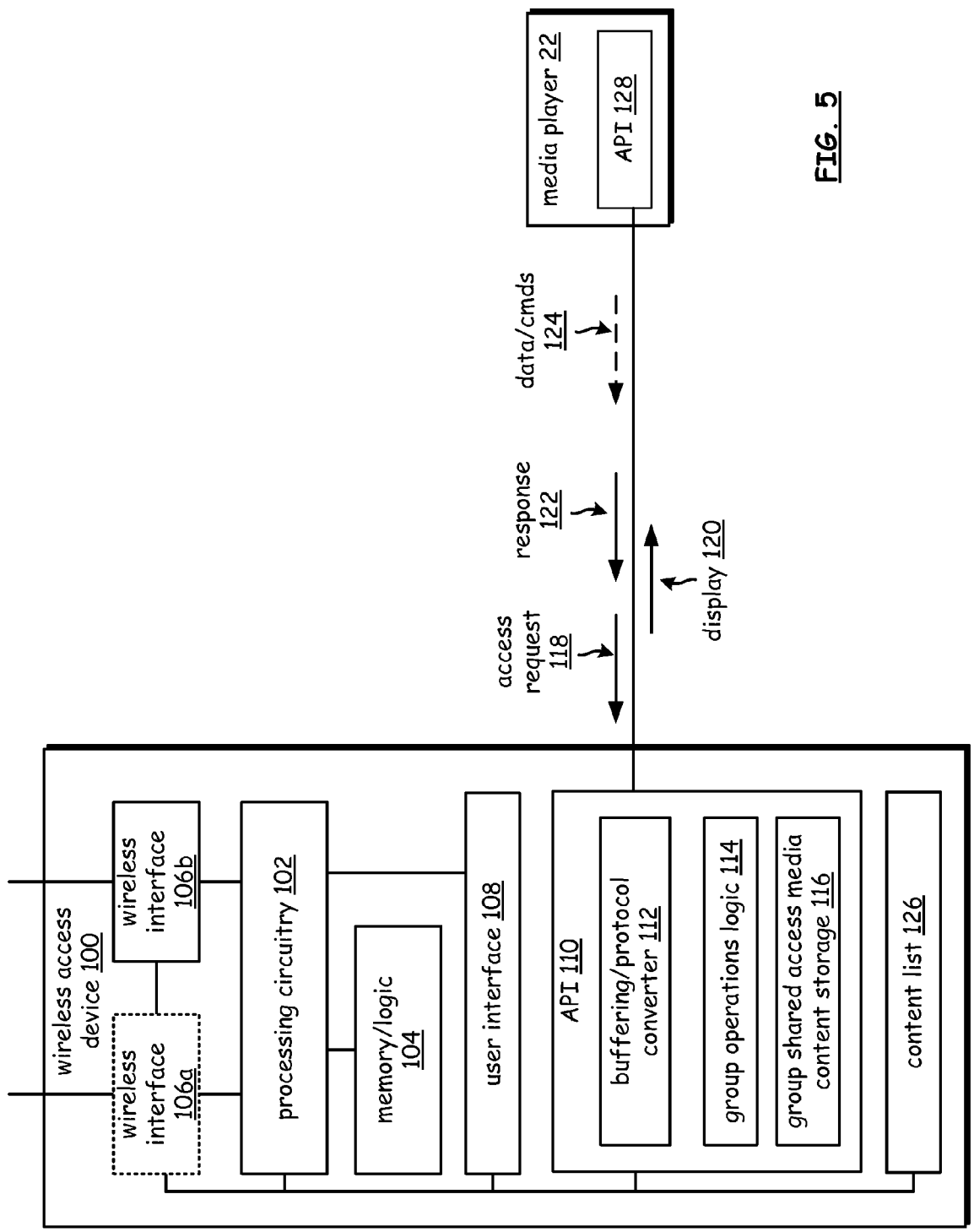
FIG. 5 is a functional block diagram of a network that includes a wireless access device for controlling access and delivering content to an associated group member device according to one embodiment of the invention.

FIG. 5 is a functional block diagram of a network that includes a wireless access device for allowing and controlling access by an associated group member device to a service, shared media, or a resource according to one embodiment of the invention. For the example of FIG. 5, the associated group member device is media player 22. A wireless access device 100 includes processing circuitry 102 and a memory 104 that stores computer instructions executed by processing circuitry 102 to define operational logic of wireless access device 100. The computer instructions include, for example, group operations logic to define interactions and communications with other devices to support group operations for accessing shared services, media and/or resources.

Wireless access device 100 also includes communications interfaces 106a and 106b. These communication interfaces represent any number of types of communications interfaces to support communications over local area networks, wireless local area networks, personal area networks and cellular networks. They also support tethering and direct coupling to devices such as printers and hard disk drives for very specific operations. Additionally, wireless access device 100 includes a user interface 108 to generate displays and audio for a user and to receive user inputs from the user.

Wireless access device 100 also includes an application programming interface block (API) 110 that defines an interface (e.g., a software based communication interface and associated logic) to support for group operations as described herein. Here, API 110 includes buffering/protocol converter 172, group operations logic 114, and storage 116 for storing group shared access media content. Generally, API 110 also includes logic and a communications interface that support group member communications for sharing services, media and/or resources of wireless access device 100. Such an interface includes, for example, signaling protocols for communicating with defined signals to request access to resources of device 100, for requesting shared media, for requesting shared media from another group member, for uploading shared media for delivery to another group member, for requesting access to shared services, and for storing access related data. The interface also can include defined signals for communicating with at least one of cell phone 30, a media source 14 or other group member to establish access rights.

API 110 also includes logic to facilitate the resource sharing between group member devices or associated devices. Thus, resource sharing logic specifically includes interfaces and signaling logic that enable other group member devices to utilize resources within wireless access device 100. For example, another device could access specific memory areas (e.g., of content storage 116), or specific resources such as software and hardware based communication interfaces. A PDA with only wireless local area network protocol radio transceiver elements, for example, may utilize cellular radio transceiver elements of wireless access device 100 to communicate over a cellular network to establish a communication link with a media source to download desired media or, alternatively, merely to establish a connection for a communication or to access a service.

To illustrate, API 110 includes computer instructions to enable wireless access device 100 to engage in resource sharing communications. The resource sharing communications include device 100 receiving an access request 118 (here, transmitted by media player 22) to share a hardware resource from device 100, transmitting display information or signals 120 to the other group member (here, media player 22) that define resource sharing options, receiving a response 122 from the other group member, and operating according to data/commands 124 received from the other group member.

The display information that wireless access device 100 is operable to transmit includes any one of a graphical user interface type of transmission or even text characters that correspond to the resource sharing options. As described before, the resource sharing may be for hardware, software, memory content, specified logic and/or data, etc. Thus, each of the signals and messages 118-124 may vary according to the specific implementation and resource sharing that is being pursued. Such resource sharing can be for a plurality of purposes including but not limited to sharing media including streaming media and services.

API 110 includes a buffering/protocol converter 112 that is similar in operation and logic to buffering/protocol converter logic described elsewhere in this specification. The buffering and protocol converter block 112 is operable to buffer shared media received on a first communications interface (e.g., interface 106a) until transmitted on a second communications interface (e.g., interface 106b). Buffering and protocol converter block 112 is further operable to, based on capabilities of at least one group member device that is to receive the shared media, convert a format or protocol used to deliver the media content to a format or protocol that is compatible with the capabilities of the group member device(s) that will receive the media content.

If the media content audio files received over the first communication interface 106a is in a first format, but is required to be delivered in a second format, device 100 converts the media content to the appropriate format. To illustrate, if wireless access device 100 is an iTunes™ capable device that communicates with a media source that delivers audio files in an AAC format, but the requesting group member device requires MP3 format audio files, block 112 is operable to buffer, if necessary, and to convert the audio files to MP3 format prior to transmitting the shared media to the group member device requesting the shared media content.

Wireless access device 100 further includes group operations logic 114 that defines group operations according to the various embodiments for accessing and sharing shared media based on a group association. Group operations logic 114 not only defines logic for group related access of group member devices as disclosed herein, but also defines logic for hardware resource sharing between group members. For example, group operations logic 114 includes resource sharing access logic that evaluates group associations to determine whether resource sharing is permitted with the other device requesting resource sharing. Such evaluation occurs prior to API 110 engaging in resource sharing communications so that only group members are allowed to share hardware resources.

Group shared access content storage 116 stores shared media for access by group member devices. Finally, wireless access device 100 includes a content list block 120 for tracking content on each of the group member devices. Content list block 120 is included in at least one embodiment in which the wireless access device is a primary group member having account access and control rights as discussed previously in relation to cell phone 30. Content list block 120 populates and updates a content list and transmits the content list to group member devices to facilitate group access to shared media. As may further be seen, API 110 is operable to communicate with APIs of remote devices such as API 182 of media player 22 as shown here.

Figure 6:
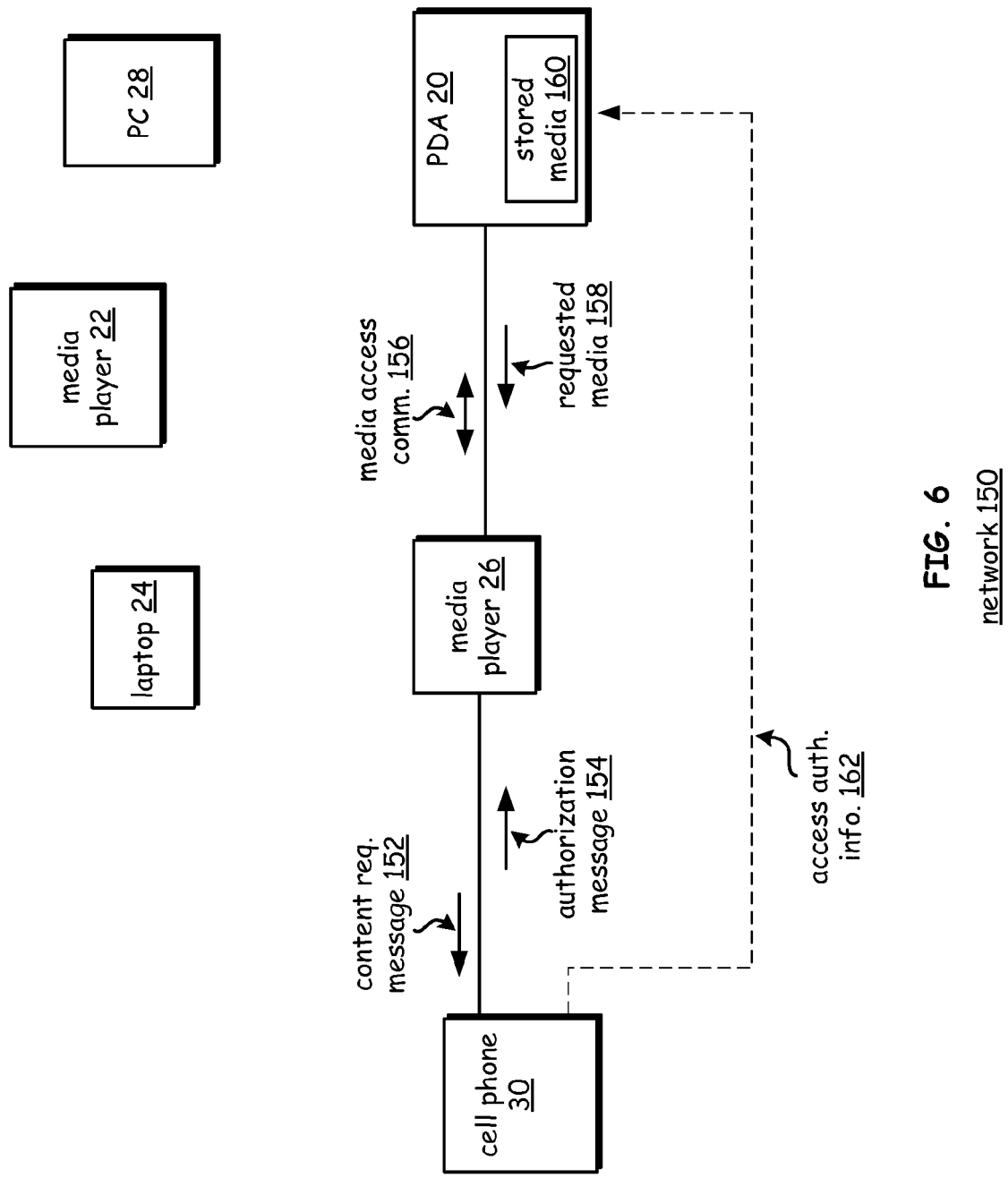
FIG. 6 is a functional block diagram that illustrates operation within a network for accessing shared media according to an embodiment of the invention in which shared media stored on one group member device is accessed by another group member device.

FIG. 6 is a functional block diagram that illustrates operation within a network for accessing shared media according to an embodiment of the invention in which shared media stored on one group member device is accessed by another group member device. Network 150 includes cell phone 30 and other group member devices of group member devices 20-30 as described before. In the described embodiment of FIG. 6, cell phone 30 authorizes a group member device to access shared media stored on another other group member device when the group member device requests shared media. More specifically, when a first group member device of group member devices 20-30 (here media player 26) transmits an access request, shown here as content request message 152, to cell phone 30 to request shared media, cell phone 30 transmits authorization message 154 to the first group member device. Media player 26, which is the first group member device in the described embodiment, receives authorization message 154 and engages in media access communications 156 with a second group member device (here, PDA 20). As may be seen, PDA 20 contains stored media 106.

Responsive to engaging in media access communications 156, PDA 20 transmits requested media 158, which is at least a portion of stored media 160. Requested media 158 may, alternately, be accessed and downloaded by PDA 20 from another media source (e.g., an associated media source). In one embodiment, cell phone 30 also transmits access authorization information 162 to PDA 20 that includes at least one of an indication of a transaction identity or an identity of media player 26. PDA 20 then validates the attempted access of media access communications 156 based on the access authorization information 162 and determines to produce requested media 158 to media player 26.

In the example shown, both the media player 26 and PDA 20 are group member devices of an associated group (e.g., networked group 12 of FIG. 1) and have access rights to the shared media that may be accessed by any of group member devices 20-30. While not shown explicitly here, the stored media 160 could have been previously loaded or retrieved by PDA 20 in response to a media request within media access communications 156.

Figure 7:
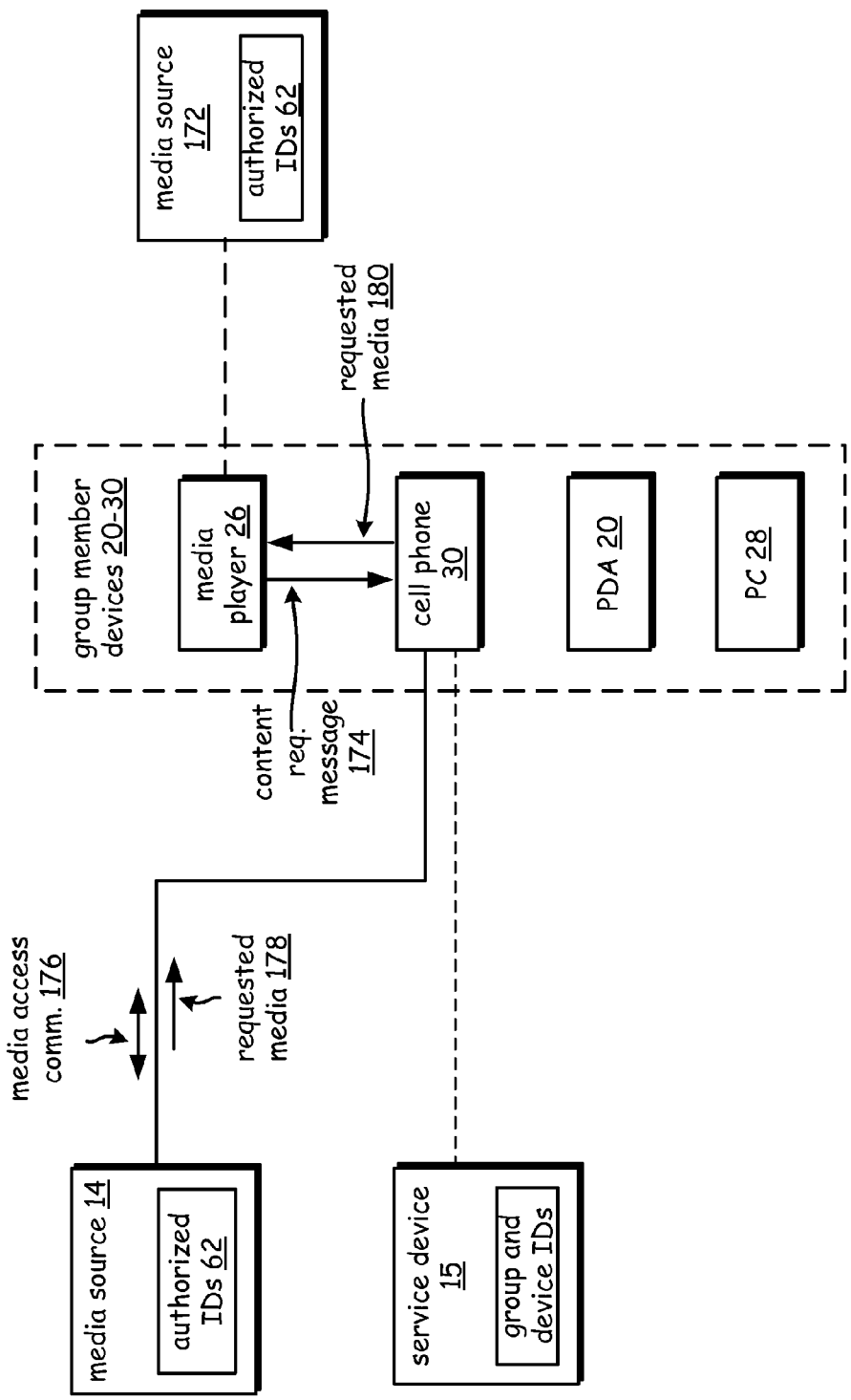
FIGS. 7 and 8 are functional block diagrams that illustrate operations for accessing shared media from a plurality of media sources in which different group members are primary group members for accessing the shared media for different corresponding media sources according to one embodiment of the invention.
Figure 8:
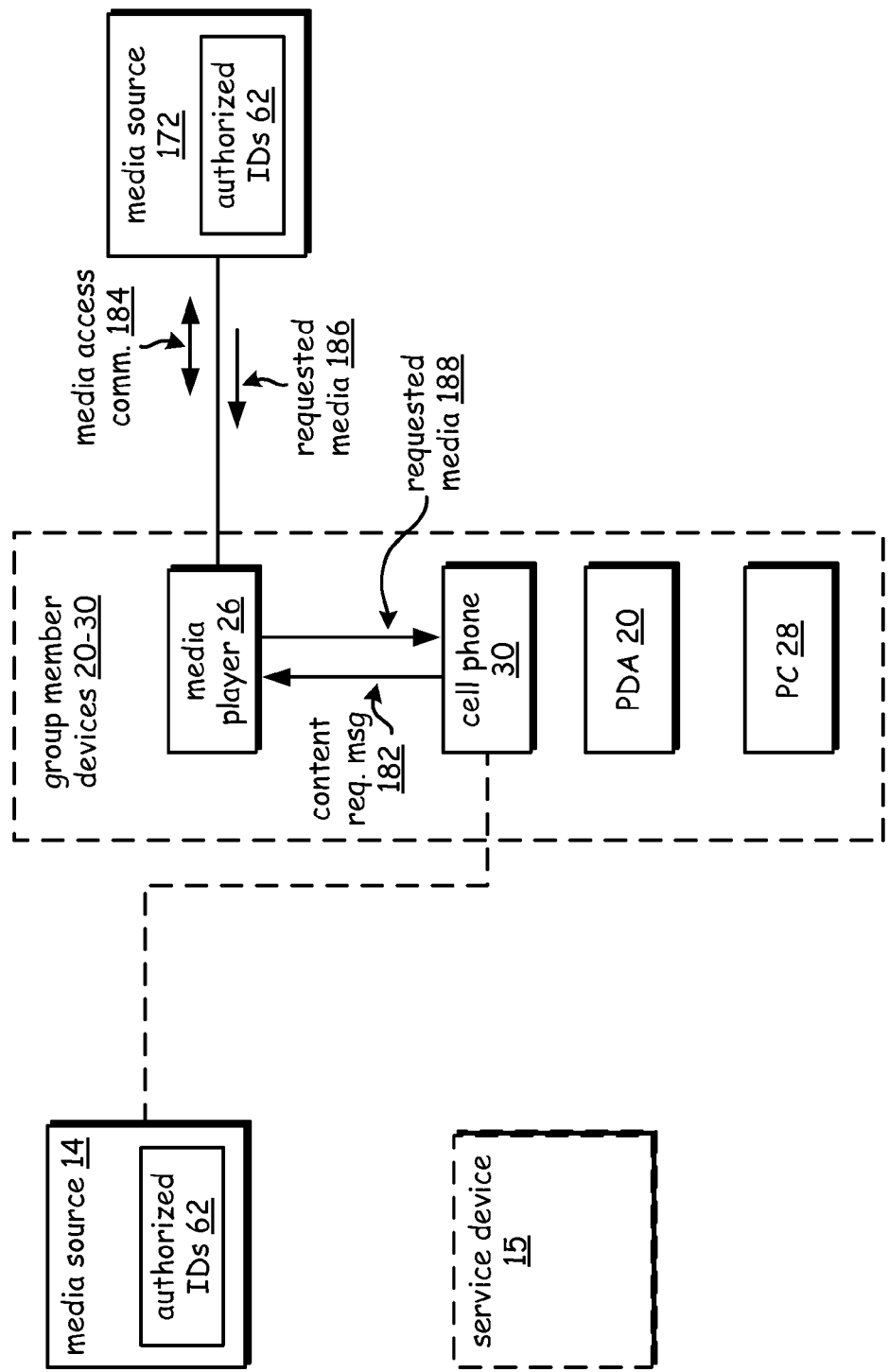

FIGS. 7 and 8 are functional block diagrams that illustrate operations for accessing shared media from a plurality of media sources in which different group members are primary group members for accessing the shared media for different corresponding media sources according to one embodiment of the invention. A network 170 includes media source 14, a service device 15 and a media source 172. In FIG. 7, cell phone 30 is a primary group member for group member devices 20-30 for shared media from media source 14 while media player 26 is a primary group member for media from media source 172. Accordingly, if media player 26 wants to access or download shared media from media source 14, media player 26 transmits a content request message 174 to cell phone 30. In response, cell phone 30 engages in media access communications 176 with media source 14 and receives or downloads requested media 178. Cell phone 30 then transmits requested media 180 to media player 26. Alternately, or additionally, cell phone 30 may be a primary group member device for service device 15 to provide or allow access to associated services for other group member devices such as media player 26, PDA 20 or PC 28.

Similarly, in FIG. 8, cell phone 30 transmits an access request in the form of a content request message 182 to media player 26 to request shared media. Here, media player 26 is a primary group member device for media from media source 172. In response, media player 26 engages in media access communications 184 with media source 172 and receives or downloads requested media 186. Media player 26 then transmits requested media 188 to cell phone 30.

One aspect of the embodiment of FIGS. 7 and 8 is that they illustrate that different groups may be defined for accessing different media sources and that different group member devices may act as primary group devices for the different groups. Additionally, the group membership is not necessarily the same for the multiple groups. A group member device can belong to multiple groups. Tiered access permissions may therefore be according to group in addition to being according to device ID for the group members.

As an additional aspect of the embodiments of the invention, each of the media sources 14 and 172 and service devices 15 includes a list of authorized ID's and associated access permissions for the group member devices. Accordingly, either in addition to or in place of any validation performed by a primary group member (e.g., cell phone 30 for media distributed from media source 14 or media player 26 for media from media source 172), media sources 14 and 172 are operable to perform access request validation.

In FIGS. 7 and 8, cell phone 30 receives an initial content request message from media player 26 for media from media source 14 while media player 26 receives an initial content request from cell phone 30 for media from media source 172. It should be understood that, in FIG. 7 cell phone 30 could receive such a content request message for media from any group member device of group member devices 20-30. Similarly, in FIG. 8, media player 26 can receive a content request message from any of the group member devices of group member devices 20-30. The content request messages of FIGS. 7 and 8 may also be any type of resource access request message to request access for any type of resource including media content. Thus, what is referenced in FIG. 7 as a content request message may actually be an access request message such as message 52 of FIG. 2 which includes a request for media content. For the example operation of FIG. 7, the access request is for content and is thus shown as content request message 174.

Figure 9:
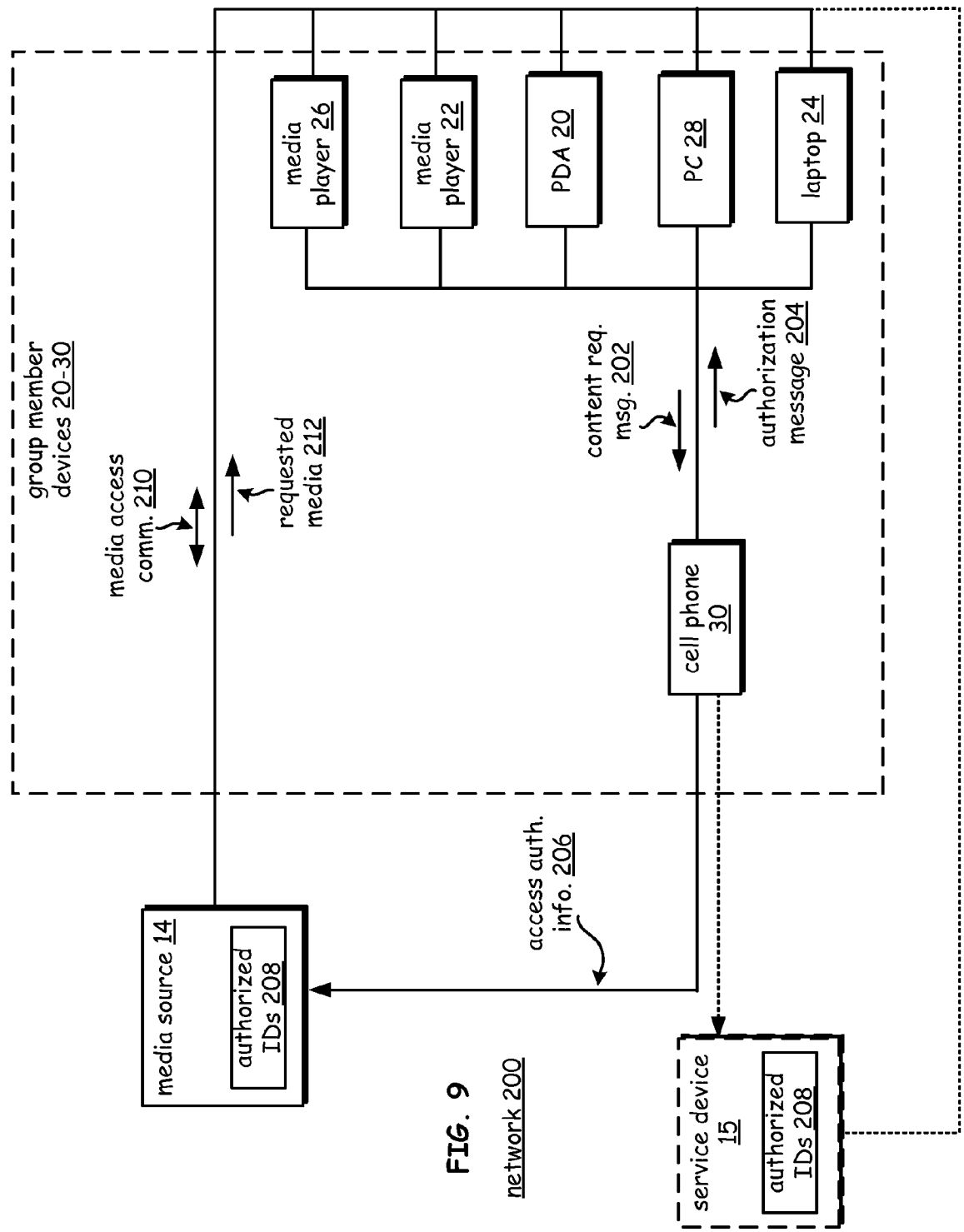
FIG. 9 is a functional block diagram of a network that illustrates operation according to one embodiment in which a primary group member device controls access to shared media or services but is not in the media or service path.

FIG. 9 is a functional block diagram of a network that illustrates operation according to one embodiment in which a primary group member device controls access to shared media or services but is not in the media or service path. When cell phone 30 receives a content request message 202 from any of the group member devices 20-30, cell phone 30 validates the access request to enable the group member devices that transmitted message 202. Once cell phone validates the access request of message 202, it transmits authorization message 204 to the group member device that originated message 202 and further transmits access authorization information 206 to media source 14 (or service device 15). Media source 14 updates, if necessary, authorized IDs 208 based on access authorization information 206.

In one embodiment, authorization message 204 and access authorization information 206 both include an authorization number. The authorization number is then included in media access communications 210 that occur between the group member device that originated message 202 and media source 14. Based on at least one of the content of authorized IDs 208 and the media access communications 210, media source 14 validates the access request and transmits requested media 212 to the group member device of group member devices 20-30 that originated content request message 202.

One aspect to note about the operations shown in FIG. 9 is that the shared media does not flow through the primary group member device that controls access to the shared media. Thus, the primary group member device controls and facilitates access to the shared media but is not in the media path for shared media from media source 14. Similarly, a primary group member device (here, cell phone 30), may control and facilitate access to shared media stored in other group member devices of group member devices 20-30 in a similar manner. In one embodiment, a primary group member device can also control and facilitate resource sharing between group members 20-30. Cell phone 30, as a primary group member device controls and facilitates access to the services provided by service device 15 but is not in the service path. Thus, in this example, service device 15 communicates directly with the corresponding group member device to provide the requested service once authorized by cell phone 30.

In reference to FIGS. 7-10, a cell phone is described in relation to operations as a primary group member. Such operations, however, may be by any type of device operating as a primary group member of the associated group member devices of group member devices 20-30. Such operations that relate to resource and media sharing control, therefore, are not limited to cell phones.

Figure 10:
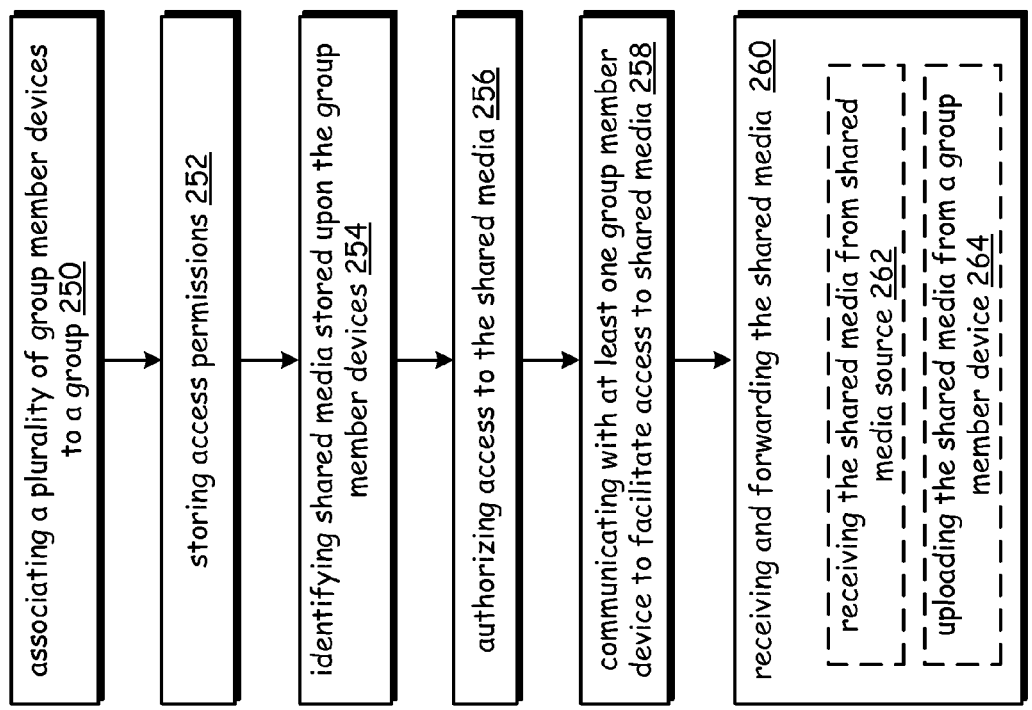
FIG. 10 is a flowchart that illustrates a method by a wireless handheld device for creating and managing group access to shared media.

FIG. 10 illustrates a method by a wireless handheld device for creating and managing group access to shared media. The method includes the wireless handheld device associating a plurality of group member devices to a group (250) and storing access permissions for accessing shared media for at least one the plurality of group member devices (252). The method further includes identifying shared media stored upon the group member devices (254). The step of identifying the shared media comprises at least one of communicating with group member devices to determine what shared media content is stored on the group member devices (that may be shared with other group member devices) and maintaining a list of shared media content that is transmitted to or downloaded by the group member devices. Based on stored digital rights management requirements for group access to shared media, the method further includes authorizing access to the shared media by at least one of the group member devices (256) and communicating with at least one group member device to facilitate access to the shared media (258).

The step of communicating with at least one group member device to facilitate access to the shared media may include receiving and forwarding the shared media to one of the plurality of group member devices (260). This step optionally includes receiving the shared media from a shared media source (262) or uploading the shared media from a group member (264). For example, if a first group member requests the shared media, the method includes uploading the shared media from a second group member for delivery to the first group member.

Figure 11:
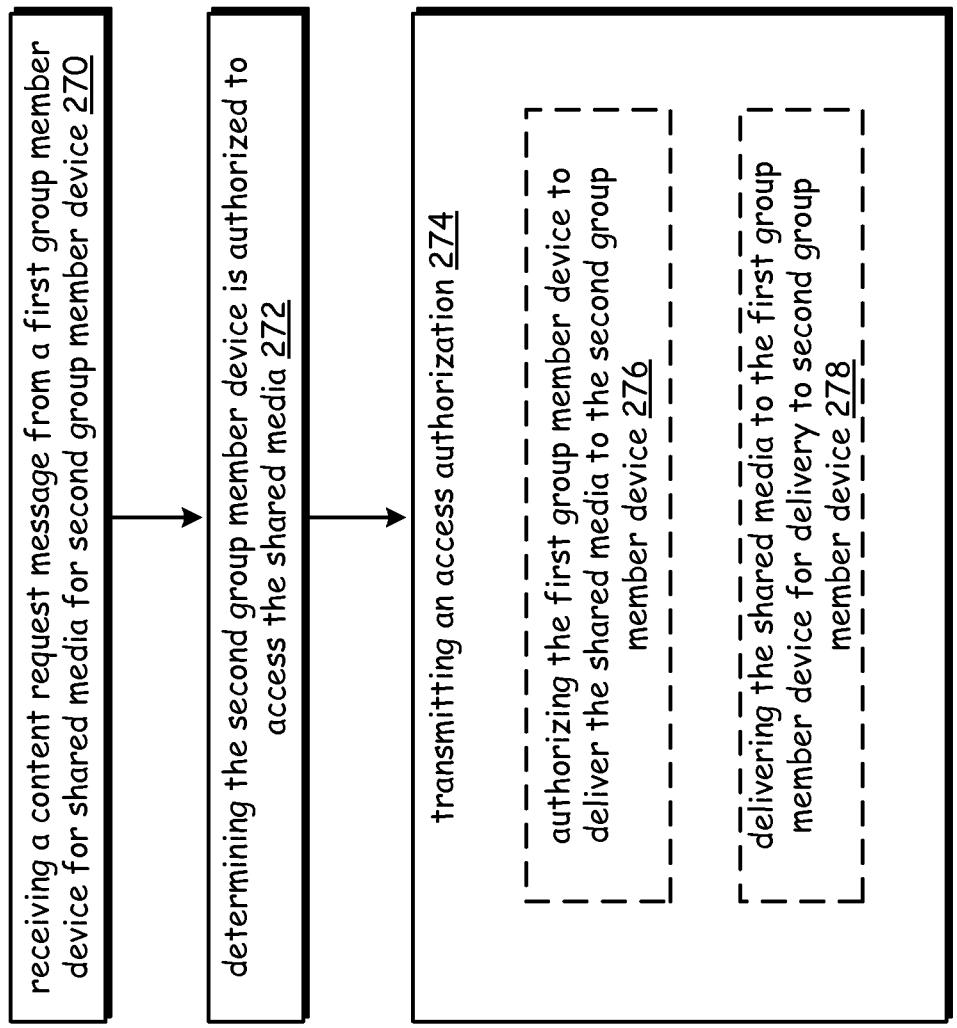
FIG. 11 is a flowchart that illustrates a method for delivering media content to one group member device through another according to one embodiment of the invention.

FIG. 11 is a flowchart that illustrates a method for delivering media content to one group member device through another according to one embodiment of the invention. The method includes a cell phone 30 receiving a content request message from a first group member device for shared media for a second group member device (270) and determining the second group member device is authorized to access the shared media (272). Thereafter, the method includes transmitting an access authorization (274) to enable either one of the first and second group member devices to access or download shared media from a media source or from another group member device for the second group member device. The method can include, for example, authorizing the first group member device to access and subsequently deliver the shared media to the second group member device (276). An alternate method includes, instead of step 276, delivering the shared media to the first group member device (278) to enable the first group member device to deliver the shared media to the second group member device.

Figure 12:
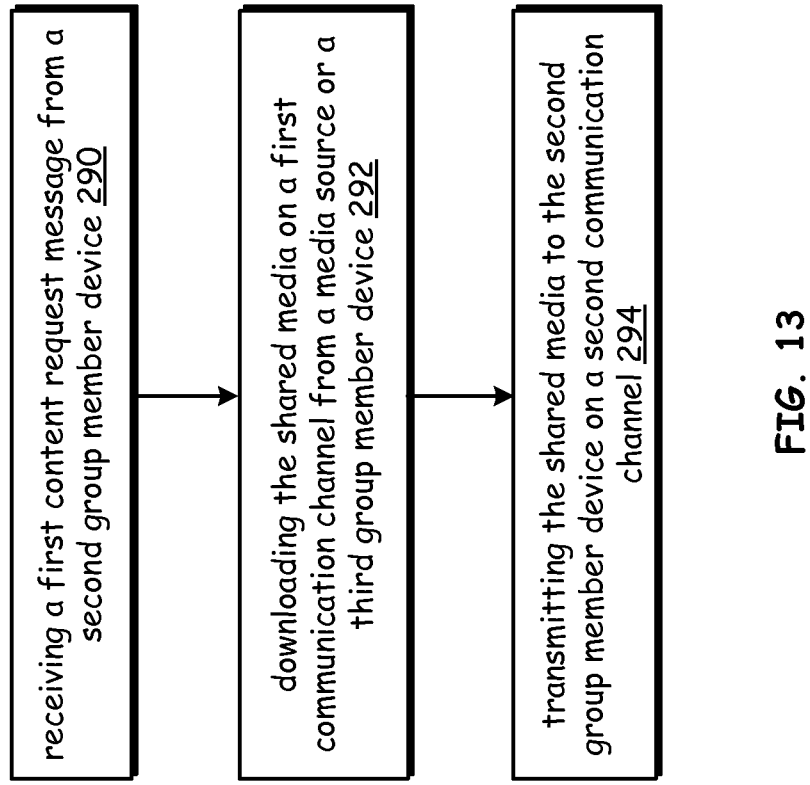
FIG. 12 is a flowchart that illustrates a method by a handheld group member device operable to deliver shared media based on a group association that includes a plurality of group member devices according to one embodiment of the invention.

FIG. 12 is a flowchart that illustrates a method by a handheld group member device operable to access shared media based on a group association that includes a plurality of group member devices according to one embodiment of the invention. The method includes receiving a content request message from another (e.g., a second) group member device (280) and determining that the second group member device is authorized to access the shared media (282). This step can include additional steps of and communicating with the media server to determine authorization. Thereafter, the method includes communicating with the other (second) group member device to allow access to the shared media (284) and then transmitting the shared media to the other group member device (286). Here, step 286 is optional as the other group member device may instead communicate with a media source or yet another group member device to download the shared media in accordance with an authorization generated in association with step 282.

Figure 13:
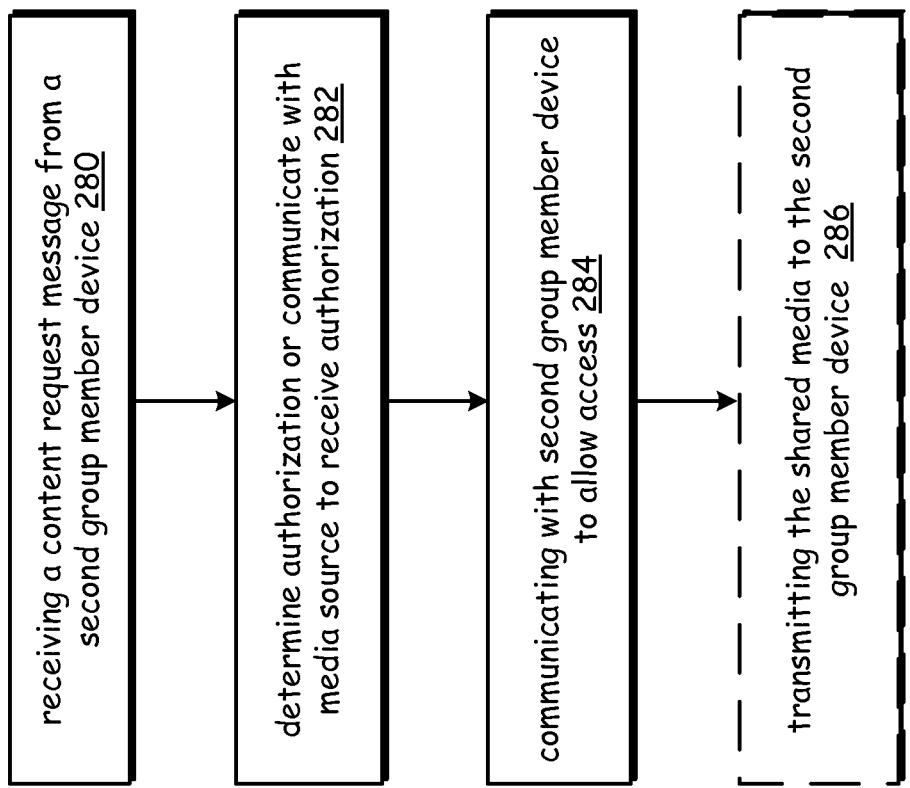
FIG. 13 is a flowchart that illustrates a method by a group member device operable to deliver shared media based on a group association that includes a plurality of group member devices according to an alternate embodiment of the invention.

FIG. 13 is a flowchart that illustrates a method by a handheld group member device operable to deliver shared media based on a group association that includes a plurality of group member devices according to one embodiment of the invention. The method includes receiving a first content request message from a second group member device (290). Thereafter, the method includes downloading the requested shared media on a first communication channel from a media source or from a third group member device (292) and transmitting the shared media to the second device on a second communication channel (294).

FIG. 14 is a flowchart that illustrates a method by a group member device operable to deliver shared media based on a group association that includes a plurality of group member devices according to an alternate embodiment of the invention. The method includes receiving a first content request message from another or second group member device (300). Thereafter, the method optionally includes receiving authorization from a media source (302). The media source that transmitted the authorization that can be a primary group member device, a media source similar to media source 14 or other device. The authorization can include authorization to transmit previously stored shared media to the other group member device.

After receiving authorization, the method can include, optionally, receiving and forwarding access information to the second group member device (304). Alternately, the method may merely include a primary group member device (that received the first content request message) merely generating and transmitting access information to the other group member device. The access information may include either an authorization code or number or an encryption key for decrypting all or at least a portion of the shared media content. Alternately, the method can include at least partially decrypting the shared media (306). Finally, the method includes transmitting the shared media to the other group member device based on the group member device being authorized to receive the media. This authorization can be determined by the device performing the method based on stored DRM specifications and/or based on a received authorization (308). In this embodiment, the handheld group member device performing the method steps of FIG. 14 had previously received and stored the shared media and is therefore sharing the stored once authorization is determined.

FIG. 15 is a flowchart that illustrates a method by a group member device for accessing shared media based on a group association that includes a plurality of group member devices according to an embodiment of the invention. The method includes receiving a content list from a primary group member device that identifies content stored on each of a plurality of group member devices (310) and transmitting a content request message to the primary group member device to request shared media identified on the content list (312). Thereafter, the method includes downloading the requested shared media from one of the primary group member device or from a second group member device (314). It should be understood that additional communications to the shared media based on a group association as described herein this specification could be included herein. The specific nature of such communications may be any of the described embodiments of such messaging and logic described above.

Figure 16:
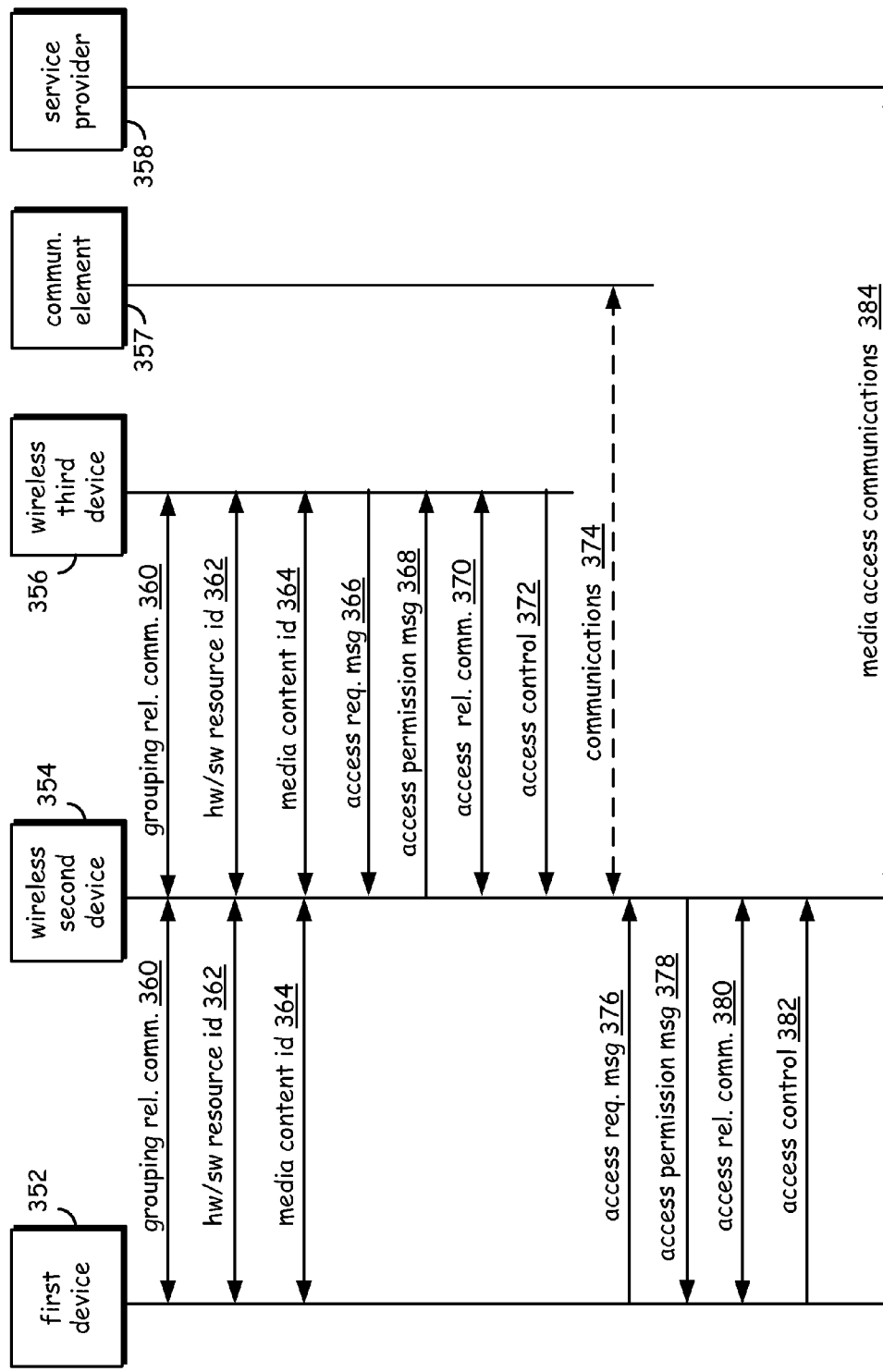
FIG. 16 is a signal sequence diagram that illustrates operation for resource sharing according to one embodiment of the invention in which a wireless devices shares resources with a plurality of devices.

FIG. 16 is a signal sequence diagram that illustrates operation for resource sharing according to one embodiment of the invention in which a wireless devices shares resources with a plurality of devices. A network 350 includes a first device 352, a wireless second device 354, a wireless third device 356, a communication element 357 and a service provider 358 that are operably disposed to communicate through wired or wireless communication paths and/or networks. First device 352 is a wireless communication device but is also capable of communicating through a wired connection such as a tether. First device 352 may also be one that is not a wireless capable device that can only communicate through wired connections.

Wireless second device 354 is capable of supporting both wired and wireless communications by way of short distance wireless communications (e.g., infrared communications, personal area network communications such as Bluetooth, radio frequency identification (RFID) communications, and other proximity based systems), longer distance wireless communications (e.g., wireless local area networks, cellular networks, satellite networks), and wired communications over the various known wired and wireless networks. Wireless third device 356 is similar to wireless second device 354. Service provider 358 is a remote device such as a server operable to communicate over a plurality of networks especially packet data networks to provide a service. For example, the services provided can include media services, data services, maintenance and repair services, etc. Communication element 357 is any type of remote device with which wireless second device 354 may communicate over any known and supported network.

Wireless second device 354 engages in grouping related communications 360 with at least one of devices 352 and 356 to establish a group or association between at least two of the three devices 352-356. Thereafter, wireless second device 354 engages in at least one of hardware and software resource identification communications 362 and media content identification communications 364 with at least one of devices 352 and 356 to identify resources and/or media or services that may be shared. Thus, communications 362 and 364 identify content and/or resources that device 352 may access. Communications 362 and 364 specifically include identification of access logic and data that may be shared. For example, the resources can include processing resources, communication resources, data storage resources, video processing resources, account management related resources, etc. The account management related resources can include software and/or stored account access information, logic, data and protocols.

In operation, for example, wireless third device 356 transmits access request message 366 to wireless second device 354. Wireless second device 354 determines whether wireless second device 354 is part of the associated group and what resource, media or service sharing access can be allowed. Wireless second device 354 then transmits first access permission message 368 to wireless third device 356 to indicate that wireless third device 356 is allowed access as identified in request message 366.

The resource requested in message 366 may be content stored within wireless second device 354 or hardware or software or other resources of wireless second device 354. The access that is granted in first access permission message 368 may be limited in any manner including a number of access times, a duration that access is allowed, or a definition or identification of which resources may be accessed wherein the identification of allowed resources may be less than that which was requested in message 366.

Wireless third device 356 and wireless second device 354 then engage in resource access related communications 370, if necessary, to support the access that was identified or approved within message 368. These communications can include wireless third device 356 generating display signals or options for wireless second device 354 to allow a user of wireless second device 354 to generate selected responses. If, for example, wireless second device 354 has limited graphing capabilities, wireless second device 354 may generate display signals to prompt wireless third device 356 to generate corresponding displays. Thus, wireless third device 356 then generates resource access/control signals 372 that correspond to the allowed access. If such access includes, for example, using hardware or software resources of wireless second device 354 to communicate with a communication element 357 to download desired media content, wireless second device 354 engages in communications 374 with communication element 357 in a corresponding manner.

In one embodiment, wireless second device 354 includes cellular communication hardware and software which is used to support communications 374 according to resource access control signals 372. In another embodiment, wireless second device 354 includes application and account related software and data that is required for communications 374. Accordingly, wireless third device 356 uses such application and accounted related software and data to download or access desired content from communication element 357. Similarly, first device 352 transmits access request message 376, receives second access permission message 378, engages in access related communications 380 and generates access control signals/messages 382, all as appropriate to a specific request.

Second access permission message 378 may be different than first access permission message 376. In one embodiment of the invention, permissions vary according to device and/or group affiliations and are tiered to give different levels of access to resources (hardware, software, media, access logic, etc.). The permission tiers may be time or usage dependent as well. For example, first device 352 may have a first level of access initially and then a subsequent (either higher or lower) level of access subsequently.

Figure 17:
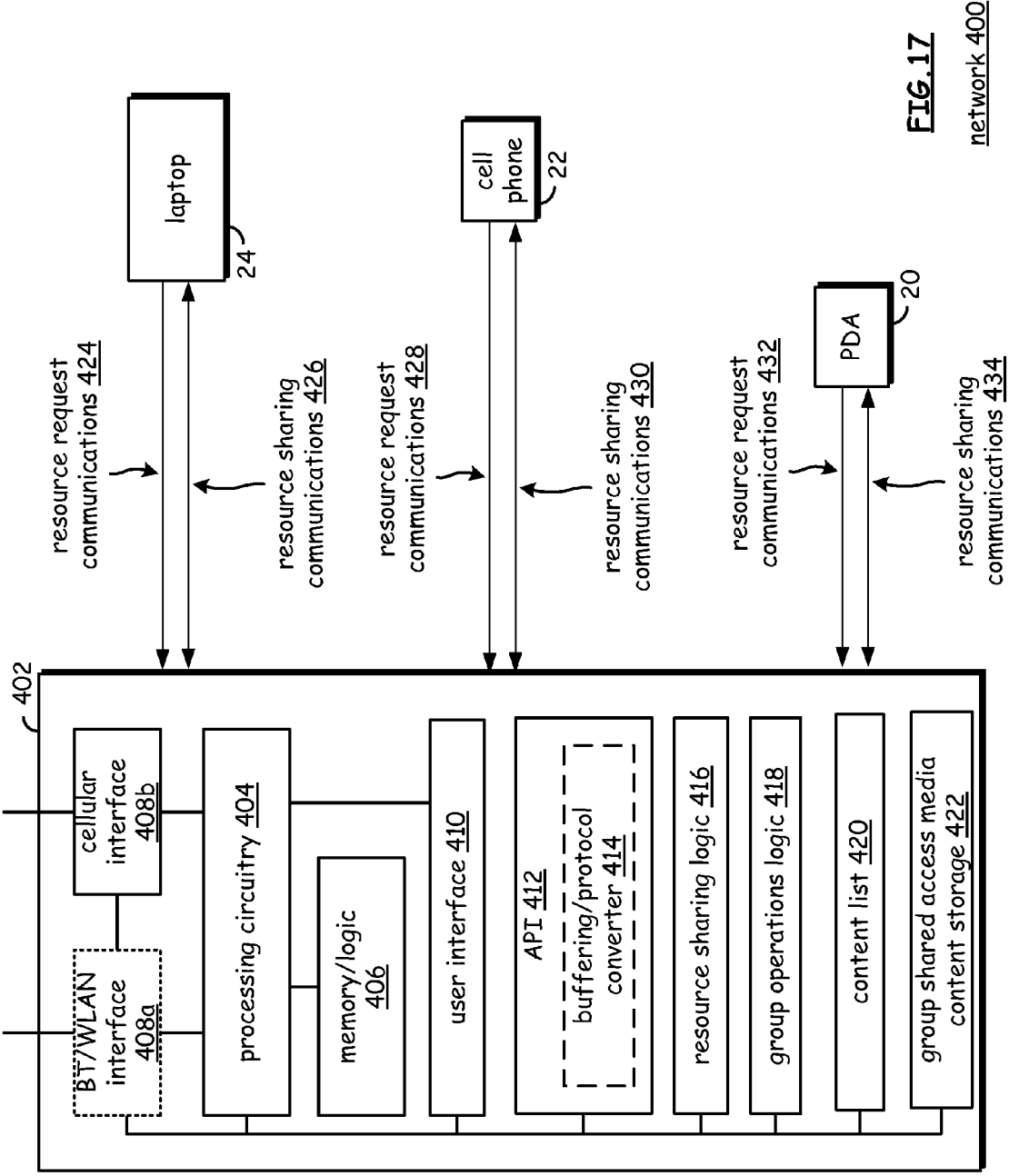
FIG. 17 is a functional block diagram of a network that includes a plurality of group member devices operating according to one embodiment of the invention having tiered permission levels for resource sharing for the group members of an associated group.

FIG. 17 is a functional block diagram of a network that includes a plurality of group member devices operating according to one embodiment of the invention having tiered permission levels for resource sharing for the group members of an associated group. A network 400 includes wireless access device 402 includes processing circuitry 404 and a memory 406 that stores computer instructions executed by processing circuitry 404 to define operational logic of wireless access device 402. The computer instructions include, for example, group operations logic to define interactions and communications with other devices to support group operations. Wireless access device 402 also includes communications interfaces 408a and 408b. It should be understood that these communication interfaces represent any number of communications interfaces to support communications over local area networks, wireless local area networks, personal area networks, cellular networks and also tethering and coupling to devices such as printers and hard disk drives for very specific operations. Additionally, wireless access device 402 includes a user interface 410 to generate displays and audio for a user and to receive user inputs from the user. In the illustrated embodiment, communications interface 408a includes at least one of a Bluetooth and a WLAN interface. Communications interface 408b includes a cellular radio wireless communication interface.

Wireless access device 400 also includes an application programming interface block (API) 412 that defines an interface and associated logic to support for group operations as described herein. Generally, API 412 includes logic and a communications interface that support group member communications for sharing media including streaming media, services, and/or other resources including hardware and software resources (including data, account and access information). Such an interface includes, for example, communicating with defined signals to request access to shared media, for requesting shared media from another group member, for uploading shared media for delivery to another group member, and for storing access related data.

API 412 includes logic 414 to facilitate hardware resource sharing between group member devices or associated devices in one embodiment. Specifically, a buffering/protocol converter logic 414 supports cross platform and protocol communications. The buffering and protocol converter 414 is operable to buffer shared media or other content received on a first communications interface (e.g., interface 408a) until transmitted on a second communications interface (e.g., interface 408b). Buffering and protocol converter 414 is further operable to, based on capabilities of at least one group member device that is to receive the shared media or other content, convert a format or protocol used to deliver the media content to a format or protocol that is compatible with the capabilities of the group member device(s) that will receive the media content.

For example, if the media content audio files received over the first communication interface 408a is in a first format, but is required to be delivered in a second format, 402 may convert the media content to the appropriate protocol. To illustrate, if wireless access device 402 is an iTunes™ capable device that communicates with a media source that delivers audio files in an AAC™ format, but the requesting group member device requires .mp3 format audio files, converter 414 is operable to buffer, if necessary, and to convert the audio files to MP3 format prior to transmitting the shared media to the group member device requesting the shared media content.

In one embodiment, wireless access device 402 includes resource sharing logic 416 for determining whether a device can access or share resources of device 402 and a level of access in an embodiment in which access levels are tiered. Alternately, at least a portion resource sharing logic 416 may be included as a part of the logic of API 412.

For example, resource sharing logic 416 can include programmable resource sharing logic that works in cooperation with resource sharing logic stored in association with API 412 (which defines more generic resource sharing logic) to support resource sharing determinations and access. Resource sharing logic also includes interfaces and signaling logic that enable other group member devices to utilize resources within wireless access device 402.

Wireless access device 402 also includes group operations logic 418. Group operations logic 418 generally defines group operations according to the various embodiments for accessing and sharing resources based on a group association. More specifically, logic 418 defines the creation and modification of groups including creating permanent groups (until the groups are modified) and temporary groups. Group operations logic 418 also includes logic that defines what resources may be shared and any conditions that are required for such sharing to comply with digital rights management or other operational concerns. In addition to logic that defines sharing permissions, other types of logic may be included. For example, group operations logic 418 could include resource sharing access logic that supports hardware and software control and operation in a resource sharing application.

Additionally, wireless access device 402 includes a memory for storing a content list 420 of device 402 as well as other devices of the associated groups of devices. Content and resource list 420 is included in at least one embodiment in which the wireless access device is a primary group member having account access and control rights as discussed previously in relation to cell phone 22. Finally, wireless access device 402 includes group shared access content storage 422 for storing shared media that may be accessed by group member devices. The content in storage 422 comprises at least a portion of the content identified in content list 420.

In the example of FIG. 17, wireless access device 402 is communicatively coupled to various devices of network 400 to support resource sharing. Thus, wireless access device 402 may engage in resource request communications (to receive a resource request) and in resource sharing communications with the devices of network 400 with which it is grouped or has an association. In one embodiment, the permissions defined in the resource sharing communications are tiered according to device identity and group affiliations thereby resulting in the various devices having different levels of resource access permissions. Thus, if laptop 24 transmits resource request message 424 to wireless access device 402, wireless access device 402 determines what level of resource sharing is allowed for laptop 24 and any corresponding limitations (e.g., duration, window of time, number of accesses or uses) and transmits first access permission message 426 that specifies the determined level of resource sharing. Similarly, wireless access device 402 transmits second access permission message 430 in response to resource request message 428 transmitted by cell phone 22 and transmits third access permission message 434 in response to resource request message 432 transmitted by PDA 20.

The resources requested in messages 424, 428 and 432, can include hardware as well as software, and account access logic and information. If a wireless access device 402 has software and hardware required to access a specified account for media, for example, the request by cell phone 22 can includes a request to utilize such software and hardware to download media using an associated account. The tiered level of allowed access may be based on the requesting device identify, capabilities, and/or group associations. For example, a first access permission message transmitted in resource sharing communications 426 with laptop 24 may only allow laptop 24 to use cellular communication circuitry and associated logic of device 402. This permission may be further limited in time, usage or duration. Thus, in this situation, if device 402 includes cellular communication circuitry and logic that allows for lower cost cellular communications, a user of device 402 may be willing to allow laptop 24 to access such resources to save money but only on a limited basis. Similarly, cell phone 22 may request access to cellular network communication circuitry and logic to place a lower cost call. Alternately, in a second access permission message transmitted in resource sharing communications 430, device 402 may also allow cell phone 22 to access group shared access media content stored in media content storage 422.

Alternately, for example, a PDA such as PDA 20 with only wireless local area network or personal area network (e.g., Bluetooth™) protocol radio transceiver elements may utilize cellular radio transceiver elements of wireless access device 402 to communicate over a cellular network to establish a communication link with a media source to download desired media or to access desired service. Thus, a third access permission message transmitted in resource sharing communications 434 may also include permissions to allow PDA 20 to use media account access logic and account data to download media from a remote media source. Generally, resource sharing may be unlimited or may be limited according to access type, resource being accessed, a specified number of successful accesses, or by time and may be tiered according to device and group associations or according to user input of device 402.

FIG. 18 is a table that illustrates an embodiment for resource sharing based on an identity of a requesting device and characteristics of requested shared media or service.

Here, resource sharing of hardware, software, data, logic and information is for the purpose sharing media, streaming media, and services. Generally, table 450 of FIG. 18 illustrates that resource sharing of hardware, software, operational logic, account information, access information and/or data can be implicitly requested by a requesting device based on an identity of the requesting device, known capabilities of the requesting device, and characteristics of the requested shared media. For example, referring to row 452, if an iPod having device ID aa1 requests an iTunes song from the iTunes music store, the group member device receiving the request determines from table 450 that, to facilitate the request, it must share its cellular transceiver resources and must allow the requesting group member device (the iPod in this example) to use account and access information in order to establish a communication link with the iTunes store, to successfully log in/purchase the shared media and to download the requested media.

Referring to row 454, the same iPod may request access to streaming media from the iTunes store or another media source. Here, the group member device receiving the request determines from table 450 that, to facilitate the request, it must share its cellular transceiver resources and must allow the requesting group member device (the iPod in this example) to use account and access information in order to establish a communication link with the streaming media source, to successfully log in/purchase the shared media, and to use processing resources to download the requested media. The processing resources can include any resources necessary for manipulating, storing, or converting the streaming media to allow access by the iPod in a way comports with its capabilities.

Referring to row 456, a requesting group member device is a cell phone having device ID ab7 and the request is for streaming media. Here, the group member device determines that the requesting group member device only needs account and access information.

Referring to row 458, a requesting group member device is a laptop computer having device ID xy9 and the request is for a specific shared media content that is already stored on a group member device. Here, the group member device determines that the requesting group member device only needs to transmit the requested shared media content to the requesting group member device.

Referring to row 460, a requesting group member device is the cell phone having device ID ab7 and the request is for a communication link. Here, the group member device determines that the requesting group member device only needs access to transceiver circuitry and therefore grants such access.

In this embodiment of the invention of FIG. 18, therefore, the resource request identifies a shared media content that may be shared by the group member devices. Based on the characteristics of the requested shared media and the identity of the requesting device, the group member device receiving the request determines what resources require sharing with the requesting device to support access to the requested shared media. Characteristics of the shared media that correspond to what resources require sharing include location or source of the requested shared media, data characteristics (size, data rate, data format, etc.).

These data characteristics, in relation to requesting device capabilities, are implicitly associated with resources other than the shared media itself that are required to support access to the requested shared media. In the shown embodiment, the group member device receiving the request stores an association of resources in relation to group member devices and shared media content similar to what is shown in Table 450 of FIG. 18. Alternately, the requesting device may request specific resources in association with the request for shared media which specific resources (hardware, software, etc.) are required to access, receive, or process the shared media.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Moreover, the term "operable to" requires a device to include logic, circuitry, or computer instructions stored in memory or other structure that facilitates the functionality associated with such language. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A wireless hand held group member device, comprising:
    a communications interface to provide an application specific interface operable to communicate with a plurality of other devices that also contain respective application specific interface via at least one wireless network and the communication interface also including telephone circuitry to communicate over a wireless telephone network;
    memory; and
    processing circuitry configured to operate with the communications interface and the memory, wherein the processing circuitry, in combination with the communications interface and memory, is operable to:
        associate the plurality of devices into a group to create a plurality of group member devices, wherein the wireless handheld group member device is to operate as a primary group member, in which the primary group member is to control sharing of shared media, services, and resources among the group member devices and in which the primary group member accesses a remote device for the group member devices via the wireless telephone network;
        receive a request message from a second group member device to access at least one of an external media, services, and resources of the remote device that is not one of the group member devices; and
        communicate with the second group member device to respond to the requested access via the communication interface by providing a menu of options for accessing the remote device, wherein the primary group member is responsive to a selected menu option by the second group member device to grant the access, when the primary group member determines that the access by the second group member is permitted, and wherein the primary group member accesses the remote device utilizing an access authorization of the primary group member permitted for accessing the remote device and transfers data from the remote device to the second group member device via the primary group member.

2. The wireless hand held group member device of claim 1, wherein the processing circuitry, in combination with the communications interface and memory, is further operable to download the shared media from a third group member device and to transfer the shared media to the second group member device.

3. The wireless hand held group member device of claim 1, wherein the processing circuitry, in combination with the communications interface and memory, is operable to transfer the shared media among the group member devices.

4. The wireless hand held group member device of claim 1, wherein the processing circuitry, in combination with the communications interface and memory, is operable to use an encryption key for shared accesses.

5. The wireless hand held group member device of claim 1, wherein the processing circuitry, in combination with the communications interface and memory, is operable to decrypt at least a portion of the shared media prior to transmitting the shared media to another device.

6. The wireless hand held group member device of claim 1, wherein the processing circuitry, in combination with the communications interface and memory, is operable to:
    identify content stored on the group member devices for sharing the content between at least two group member devices.

7. The wireless hand held group member device of claim 1, wherein the processing circuitry, in combination with the communications interface and memory, is operable to:
    receive a request from the second group member device to share a resource;
    transmit a permission message as part of the menu of options to the second group member device to allow access to the resource, the permission message specifying one of a plurality of tiered permissions that are based upon at least one of the second group member device identity, capability, and group associations;
    receive a response from the second group member device; and
    operate according to commands received from the second group member device.

8. The wireless hand held group member device of claim 1, wherein the processing circuitry, in combination with the communications interface and memory, is operable to:
    receive a request for a web server web page that offers authorized services from the second group member device over a first communication channel;
    communicate with the web server associated with the requested web page over a second communication channel to receive a first response from the web server;
    generate and transmit corresponding display information to the second group member device;

receive a second response from the second group member device; and transmit the second response from the second group member device to the web server.

9. The wireless hand held group member device of claim 8, wherein the processing circuitry, in combination with the communications interface and memory, is operable to:

determine at least one web server address that corresponds to the requested web page;

determine the second group member device is authorized to access the at least one web server;

retrieve at least one Internet Protocol address for the web server to support operations associated with the second group member device request for the web page;

determine whether buffering, formatting, or protocol conversion is necessary; and if required, buffer, format or perform a protocol conversion for transmissions between the web server and the second group member device.

10. The wireless hand held group member device of claim 8, wherein the processing circuitry, in combination with the communications interface and memory, is operable to transmit to the second group member device at least one of:

usage instructions;

methods of interaction with the web server; and a busy indication.

11. The wireless hand held group member device of claim 1, wherein the processing circuitry, in combination with the communications interface and memory, is operable to:

maintain a billing record of fee based access to at least one of the external media, services and resources for the group member devices; and transmit the billing record to a remote device to support billing operations.

12. A method for controlling access performed by a first wireless transceiver device, comprising:

receiving, in a processing circuitry coupled to a communications interface and a memory of the first wireless transceiver device, a request message from a second wireless transceiver device, in which the communication interface to provide an application specific interface operable to communicate with a plurality of other devices that also contain respective application specific interface and in which the communication interface also including telephone circuitry to communicate over a wireless telephone network, wherein the processing circuitry is to associate the plurality of other devices, including the second wireless transceiver device, with the first wireless transceiver device into a group, wherein the first wireless transceiver device is to operate as a primary group member for the group to control sharing of shared media, services, and resources, and wherein the first wireless transceiver device accesses a remote device for the group member devices via the wireless telephone network, the request message requesting to access an external service, resource or media of the remote device, which is not a member device of the group; and responding to the request message by providing a menu of options for accessing the remote device, wherein the first wireless transceiver device is responsive to a selected menu option by the second wireless transceiver device to grant the access, when the first wireless transceiver device determines that the access by the second wireless transceiver device is permitted, and wherein the first wireless transceiver device accesses the remote device utilizing an access authorization of the first wireless transceiver device permitted for accessing the remote device and transfers data from the remote device to the second wireless transceiver device via the first wireless transceiver device.

13. The method of claim 12 further including:

receiving an access request in the request message for resources of the first wireless transceiver device to enable the second wireless transceiver device to use telephone circuitry of the first wireless transceiver device; and allowing the second wireless transceiver device to use the telephone circuitry of the first wireless transceiver device to make a call, wherein:

the first wireless transceiver device and the second wireless transceiver device to communicate over one of a wireless local area network protocol, a personal area network protocol or a wired connection while the second wireless transceiver device is using the telephone circuitry of the first wireless transceiver device.

14. The method of claim 12 further including:

receiving, in the selected menu option, a request to access external media or external service and based on an identity of the second wireless transceiver device and characteristics of the external media or service identified in the selected menu option, determining at least one of:

whether at least one hardware resource is required to be shared with the second wireless transceiver device to support the access;

whether a software resource is required to be shared with the second wireless transceiver device to support the access; and whether account or access information is required to be shared with the second wireless transceiver device to support the access.

15. The method of claim 14, wherein shared accesses use an encryption key.

16. The method of claim 12 further including decrypting at least a portion of the shared media from a group member device prior to transmitting the shared media to the second wireless transceiver device.

17. The method of claim 14 further including:

identifying content stored on each of the group member devices for sharing the content between two group member devices.

18. The method of claim 14 further including:

receiving in the selected menu option, a request to share a hardware resource from the second wireless transceiver device;

transmitting display information to the second wireless transceiver device;

receiving a response from the second wireless transceiver device; and operating according to commands received from the second wireless transceiver device.

19. The method of claim 14 further including:

receiving a request from the second wireless transceiver device over a first communication channel for a web server web page that offers authorized services;

communicating with the web server associated with the requested web page over a second communication channel to receive content from the web server;

generating and transmitting corresponding display information to the second wireless transceiver device;

receiving a response from the second wireless transceiver device; and transmitting the response from the second wireless transceiver device to the web server.

20. The method of claim 14 further including transmitting to the second wireless transceiver device at least one of:
usage instructions;
methods of interaction with the web server;
testing related parameters; and
requests for authorization of currently unauthorized functionality.

21. The method of claim 14 further including:
determining at least one web site address that corresponds to the requested web page;
determining the second wireless transceiver device is authorized to access the at least one web site; and
retrieving at least one Internet Protocol address for the at least one web site to support operations associated with the second wireless transceiver device request for the web page.

22. A wireless hand held group member device for managing a group of wireless devices operating within a group to share media content resident on the group member devices and to request access to external media content, the wireless hand held group member device comprising:
a communications interface to provide an application specific interface operable to communicate with a group of other wireless devices that also contain respective application specific interface via at least one of a wired and a wireless network and the communication interface also including telephone circuitry to communicate over a wireless telephone network;
memory; and
processing circuitry coupled to the communications interface and the memory, wherein the processing circuitry, in combination with the communications interface and memory, is operable to:
communicate with the group of wireless devices to establish an associated group of member devices, wherein the wireless hand held group member device is to operate as a primary group member, in which the primary group member is to control sharing of shared media content resident on the group member devices and in which the primary group member accesses a remote device for the group member devices via the wireless telephone network;
receive a request transmitted by a second group member device to access the external media content of the remote device that is not one of the group member devices; and
communicate with the second group member device via the communication interface by providing a menu of options for accessing the remote device, wherein the primary group member is responsive to a selected menu option by the second group member device to allow the access to the external media content, when the primary group member determines that the access by the second group member is permitted, and wherein the primary group member accesses the remote device utilizing an access authorization of the primary group member permitted for accessing the remote device and transfers the external media content from the remote device to the second group member device via the primary group member.

23. The wireless hand held group member device of claim 22, wherein the processing circuitry is further operable to maintain a content list of the shared media content stored in the group member devices and to transmit the content list to at least another of the group member devices.

24. The wireless hand held group member device of claim 22, wherein the processing circuitry is further operable to support different levels of access for at least two of the group member devices.

25. The wireless hand held group member device of claim 22, wherein the processing circuitry further operable to:
monitor a number of times the external media content is accessed by one or more group member devices; and
deny access after the external media content has been accessed a specified number of times by the one or more group member devices.

26. The wireless hand held group member device of claim 25, wherein the processing circuitry is further operable to:
maintain a billing record for fee based access to the external media content by the group member devices.

27. The wireless hand held group member device of claim 22, wherein the processing circuitry, in combination with the communications interface, is further operable to:
buffer shared media content that is received from a media source within the group; and
transmit the buffered shared media content to another group member device.

28. The wireless hand held group member device of claim 22, wherein the processing circuitry, in combination with the communications interface, is further operable to:
determine a required format or protocol for the shared media content for a particular group member device based upon device capabilities of the particular group member device;
format the shared media content to correspond with the required format or protocol; and
transmit the shared media content in the required format or protocol to the particular group member device.

29. The wireless hand held group member device of claim 22, wherein the processing circuitry, in combination with the communications interface, is further operable to transmit an encryption key to a particular group member device for the particular group member device to access the shared media content.

* * * * *